United States Patent
Sun et al.

(10) Patent No.: US 12,130,899 B2
(45) Date of Patent: Oct. 29, 2024

(54) VOICEPRINT RECOGNITION METHOD AND DEVICE

(71) Applicant: Huawei Technologies Co., Ltd., Shenzhen (CN)

(72) Inventors: Yuan Sun, Xi'an (CN); Shuwei Li, Xi'an (CN); Youyu Jiang, Dongguan (CN); Shen Qu, Xi'an (CN); Ming Kuang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 297 days.

(21) Appl. No.: 17/587,904

(22) Filed: Jan. 28, 2022

(65) Prior Publication Data

US 2022/0229891 A1    Jul. 21, 2022

Related U.S. Application Data

(63) Continuation of application No. PCT/CN2020/103583, filed on Jul. 22, 2020.

(30) Foreign Application Priority Data

Jul. 29, 2019 (CN) .......................... 201910688841.9

(51) Int. Cl.
*H04L 9/00* (2022.01)
*G06F 21/32* (2013.01)
*G10L 17/22* (2013.01)

(52) U.S. Cl.
CPC .............. *G06F 21/32* (2013.01); *G10L 17/22* (2013.01)

(58) Field of Classification Search
CPC .......... G06F 21/32; G10L 17/22; G10L 17/06
See application file for complete search history.

(56) References Cited

U.S. PATENT DOCUMENTS

| 9,294,617 B2 * | 3/2016 | Brunn ..................... H04L 67/12 |
| 2016/0019889 A1 * | 1/2016 | Alvarez Guevara ... G10L 19/00 704/254 |
| 2016/0134736 A1 | 5/2016 | Brunn et al. |

FOREIGN PATENT DOCUMENTS

| CN | 102138175 A | 7/2011 |
| CN | 102263643 A | 11/2011 |
| CN | 105096937 A | 11/2015 |
| CN | 105096940 A | 11/2015 |

(Continued)

*Primary Examiner* — Daniel B Potratz
*Assistant Examiner* — Syed M Ahsan
(74) *Attorney, Agent, or Firm* — Leydig, Voit & Mayer, Ltd.

(57) ABSTRACT

This application provides a voiceprint recognition method and device. The method includes: calculating, by an electronic device a first confidence value that an entered voice belongs to a first registered user, and calculating a second confidence value that the entered voice belongs to a second registered user. The method further includes: calculating, by another electronic device, a third confidence value that the entered voice belongs to the first registered user, and calculating a fourth confidence value that the entered voice belongs to the second registered user. A server determines, based on the first confidence value and the third confidence value, a fifth confidence value that a user is the first registered user, and determines, based on the second confidence value and the fourth confidence value, a sixth confidence value that the user is the second registered user.

18 Claims, 5 Drawing Sheets

(56) References Cited

FOREIGN PATENT DOCUMENTS

| | | | | |
|---|---|---|---|---|
| CN | 106098068 | A | 11/2016 | |
| CN | 106164921 | A | 11/2016 | |
| CN | 106531151 | A | 3/2017 | |
| CN | 108776795 | A | 11/2018 | |
| CN | 106098068 | B * | 7/2019 | ............ G10L 17/08 |
| CN | 110600041 | A | 12/2019 | |
| WO | 2018067531 | A1 | 4/2018 | |

* cited by examiner

VOICEPRINT RECOGNITION METHOD AND DEVICE

CROSS-REFERENCE TO RELATED APPLICATIONS

This application is a continuation of International Application No. PCT/CN2020/103583, filed on Jul. 22, 2020, which claims priority to Chinese Patent 201910688841.9, filed on Jul. 29, 2019. The disclosures of the aforementioned applications are hereby incorporated by reference in their entireties.

TECHNICAL FIELD

Embodiments of this application relate to the field of voice recognition technologies, and in particular, to a voiceprint recognition method and a device.

BACKGROUND

Voiceprint recognition is a biometric recognition technology. A device that supports the voiceprint recognition may perform voiceprint recognition on a user, and provide a "speaker recognition" capability based on a voiceprint recognition result of the device, that is, determine a user identity of a voice based on a voiceprint of the voice, so as to provide a personalized service. For example, when the device receives a voice "Xiaoyi Xiaoyi, play a song" from the user, the device may perform voiceprint recognition on the voice. If a voiceprint recognition result indicates a user 1, music is played based on a usage habit of the user 1. For example, a song is selected based on a playing record of the user 1 for playing. If the voiceprint recognition result indicates a user 2, music is played based on a usage habit of the user 2. For example, a song is selected based on a playing record of the user 2 for playing.

In the voiceprint recognition, recognition errors may occur. For example, a voice of the user 1 is recognized as a voice of the user 2. For ease of description, a case in which a voice of a user is mistakenly recognized as a voice of another user is referred to as a false entry below.

If the false entry occurs, the user may worry about personal privacy leakage. Consequently, information security cannot be ensured, and user experience is poor. For example, the device receives a voice "Xiaoyi Xiaoyi, show me tomorrow's meeting schedule" from the user 1. If the device recognizes the voice of the user 1 as the voice of the user 2, the false entry occurs. In this case, the device plays a meeting schedule of the user 2. Consequently, leakage of personal privacy of the user 2 is caused, the user 1 fails to obtain correct information, and user experience is poor.

In the voiceprint recognition, how to reduce a false entry rate and improve user experience is a problem that needs to be resolved.

SUMMARY

Embodiments of this application provide a voiceprint recognition method and device, to effectively reduce a false entry rate in a multi-device scenario.

According to a first aspect, an embodiment of this application provides a voiceprint recognition method. The method may include: in response to a voice input of a user, a first electronic device receives a first voice entered by the user, and a second electronic device receives a second voice entered by the user, where the first electronic device includes first voiceprint information of a first registered user and second voiceprint information of a second registered user, and the second electronic device includes third voiceprint information of the first registered user and fourth voiceprint information of the second registered user; the first electronic device determines, based on the first voiceprint information, first confidence that the first voice belongs to the first registered user, and determines, based on the second voiceprint information, second confidence that the first voice belongs to the second registered user; the second electronic device determines, based on the third voiceprint information, third confidence that the second voice belongs to the first registered user, and determines, based on the fourth voiceprint information, fourth confidence that the second voice belongs to the second registered user; the first electronic device sends the first confidence and the second confidence to a server, and the second electronic device sends the third confidence and the fourth confidence to the server; the server receives the first confidence, the second confidence, the third confidence, and the fourth confidence, determines, based on the first confidence and the third confidence, fifth confidence that the user is the first registered user, and determines, based on the second confidence and the fourth confidence, sixth confidence that the user is the second registered user; and if the fifth confidence is greater than the sixth confidence, the server determines that the user is the first registered user, and if the sixth confidence is greater than the fifth confidence, the server determines that the user is the second registered user.

In the method, the server determines a voiceprint recognition result based on the confidence calculated by the plurality of electronic devices, so that impact of voiceprint recognition accuracy of a single electronic device on the voiceprint recognition result can be reduced, and a false entry rate of the voiceprint recognition can be reduced.

With reference to the first aspect, in a possible design manner, that the server determines, based on the first confidence and the third confidence, fifth confidence that the user is the first registered user includes: the server determines the fifth confidence by performing weighted summation on the first confidence and the third confidence. That the server determines, based on the second confidence and the fourth confidence, sixth confidence that the user is the second registered user includes: the server determines the sixth confidence by performing weighted summation on the second confidence and the fourth confidence.

In this implementation, the server performs weighted summation on the confidence calculated by the plurality of electronic devices, to obtain the corrected confidence: the fifth confidence and the sixth confidence. In this way, a weight of confidence calculated by each electronic device during weighted summation may be adjusted, so that the corrected confidence is more close to confidence calculated by an electronic device with relatively high reliability. In this way, accuracy of the voiceprint recognition result is improved.

With reference to the first aspect, in a possible design manner, that the server determines, based on the first confidence and the third confidence, fifth confidence that the user is the first registered user, and determines, based on the second confidence and the fourth confidence, sixth confidence that the user is the second registered user includes: the server corrects the first confidence, the second confidence, the third confidence, and the fourth confidence based on a correction factor; determines the fifth confidence based on the corrected first confidence and the corrected third confidence; and determines the sixth confidence based on the corrected second confidence and the corrected fourth confidence.

In this implementation, the server may correct the confidence calculated by the electronic device, and determine the voiceprint recognition result based on the corrected confidence corresponding to the plurality of electronic devices. In this way, impact of voiceprint recognition accuracy of a single electronic device on the voiceprint recognition result can be reduced.

With reference to the first aspect, in a possible design manner, the correction factor includes one or more of a device configuration factor, a voiceprint registration duration factor, and a device usage duration factor, where the device configuration factor is related to a configuration of an electronic device, the voiceprint registration duration factor is related to voiceprint information, and the device usage duration factor is related to usage duration of the electronic device. Optionally, when the configuration of the electronic device is relatively high, a relatively large device configuration factor may be set. When the voiceprint registration information is relatively new, a large voiceprint registration duration factor is set. When the use duration of the electronic device is relatively short, a relatively large device usage duration factor is set. In this way, a weight of confidence calculated by each electronic device is set based on factors such as the configuration of the electronic device, the voiceprint registration duration, and the device usage duration, so that a weight of confidence calculated by a device with relatively high reliability of a voiceprint recognition result is relatively high, and a weight of confidence calculated by a device with relatively low reliability of a voiceprint recognition result is relatively low.

With reference to the first aspect, in a possible design manner, before that the server determines, based on the first confidence and the third confidence, fifth confidence that the user is the first registered user, and determines, based on the second confidence and the fourth confidence, sixth confidence that the user is the second registered user, the method further includes: if the first confidence is greater than the second confidence and the third confidence is greater than the fourth confidence, the server determines that the user is the first registered user; or if the first confidence is less than the second confidence and the third confidence is less than the fourth confidence, the server determines that the user is the second registered user.

In other words, if the voiceprint recognition results of the first electronic device and the second electronic device are consistent, it indicates that reliability of the current voiceprint recognition result is relatively high, and a false entry rate is relatively low. In this way, the server determines that the voiceprint recognition result is a voiceprint recognition result determined based on confidence reported by any electronic device. In this case, the server may skip a step of correcting the confidence calculated by the first electronic device and the second electronic device, and performing voiceprint recognition by using the corrected confidence.

With reference to the first aspect, in a possible design manner, that the server determines, based on the first confidence and the third confidence, fifth confidence that the user is the first registered user, and determines, based on the second confidence and the fourth confidence, sixth confidence that the user is the second registered user includes: if the first confidence is greater than the second confidence and the third confidence is less than the fourth confidence, the server determines, based on the first confidence and the third confidence, the fifth confidence that the user is the first registered user, and determines, based on the second confidence and the fourth confidence, the sixth confidence that the user is the second registered user; and if the first confidence is less than the second confidence and the third confidence is greater than the fourth confidence, the server determines, based on the first confidence and the third confidence, the fifth confidence that the user is the first registered user, and determines, based on the second confidence and the fourth confidence, the sixth confidence that the user is the second registered user.

In other words, if the voiceprint recognition results of the first electronic device and the second electronic device are inconsistent, the server corrects the confidence calculated by the first electronic device and the second electronic device, to obtain the corrected confidence, and performs voiceprint recognition by using the corrected confidence.

With reference to the first aspect, in a possible design manner, in response to the fact that the server determines that the user is the first registered user, the first electronic device or the second electronic device outputs first information related to the first registered user; and in response to the fact that the server determines that the user is the second registered user, the first electronic device or the second electronic device outputs second information related to the second registered user. In other words, the electronic device provides a corresponding service for the identified user based on the voiceprint recognition result of the server.

With reference to the first aspect, in a possible design manner, before that the server determines, based on the first confidence and the third confidence, the fifth confidence that the user is the first registered user, and determines, based on the second confidence and the fourth confidence, the sixth confidence that the user is the second registered user, the server further determines that the first electronic device and the second electronic device belong to a same group. In other words, the server performs voiceprint recognition based on confidence calculated by electronic devices in a same group.

With reference to the first aspect, in a possible design manner, that the first electronic device and the second electronic device belong to the same group includes: the first electronic device and the second electronic device belong to a same local area network, or the first electronic device and the second electronic device are bound to a same account.

It may be understood that the voiceprint recognition method in the first aspect may further include more electronic devices. For example, the voiceprint recognition method may further include a third electronic device, a fourth electronic device, and a fifth electronic device. In response to the voice entered by the user, the third electronic device receives a third voice entered by the user, the fourth electronic device receives a fourth voice entered by the user, and the fifth electronic device receives a fifth voice entered by the user. The third electronic device includes fifth voiceprint information of the first registered user and sixth voiceprint information of the second registered user. The fourth electronic device includes seventh voiceprint information of the first registered user and eighth voiceprint information of the second registered user. The fifth electronic device includes ninth voiceprint information of the first registered user and tenth voiceprint information of the second registered user. The third electronic device determines, based on the fifth voiceprint information, seventh confidence that the third voice belongs to the first registered user, and determines, based on the sixth voiceprint information, eighth confidence that the third voice belongs to the second registered user. The fourth electronic device determines, based on the seventh voiceprint information, ninth confidence that the fourth voice belongs to the first registered user, and determines, based on the eighth voiceprint information, tenth confidence that the fourth voice belongs to the second registered user. The fifth electronic device determines, based on the ninth voiceprint information, eleventh confidence that the fifth voice belongs to the first registered user, and determines, based on the tenth voiceprint information, twelfth confidence that the fifth voice belongs to the second registered user. The third electronic device sends the seventh confidence and the eighth confidence to the server, the fourth electronic device sends the ninth confidence and the tenth confidence to the server, and the fifth electronic device sends the eleventh confidence and the twelfth confidence to the server. The server receives the seventh confidence, the eighth confidence, the ninth confidence, the tenth confidence, the eleventh confidence, and the twelfth confidence.

The server may determine, based on the first confidence, the third confidence, the seventh confidence, the ninth confidence, and the eleventh confidence, thirteenth confidence that the user is the first registered user, and determine, based on the second confidence, the fourth confidence, the eighth confidence, the tenth confidence, and the twelfth confidence, fourteenth confidence that the user is the second registered user. If the thirteenth confidence is greater than the fourteenth confidence, the server determines that the user is the first registered user. If the fourteenth confidence is greater than the thirteenth confidence, the server determines that the user is the second registered user.

With reference to the first aspect, in a possible design manner, the first electronic device further includes eleventh voiceprint information of the third registered user, and the first electronic device determines, based on the eleventh voiceprint information, fifteenth confidence that the first voice belongs to the third registered user. If the first confidence and the second confidence are greater than a preset first confidence threshold, and the fifteenth confidence is less than or equal to the first confidence threshold, the electronic device sends the first confidence and the second confidence to the server, and does not send the fifteenth confidence. In other words, the electronic device reports, to the server, only confidence greater than a preset confidence threshold. Reliability of confidence less than or equal to the preset confidence threshold is relatively low. When performing voice recognition, the server can ignore the confidence with the relatively low reliability.

According to a second aspect, an embodiment of this application provides a voiceprint recognition system. The system may include a first electronic device, a second electronic device, and a server. The first electronic device is configured to receive, in response to a voice input of a user, a first voice entered by the user. The first electronic device includes first voiceprint information of a first registered user and second voiceprint information of a second registered user. The second electronic device is configured to receive, in response to the voice input of the user, a second voice entered by the user. The second electronic device includes third voiceprint information of the first registered user and fourth voiceprint information of the second registered user. The first electronic device is further configured to: determine, based on the first voiceprint information, first confidence that the first voice belongs to the first registered user, and determine, based on the second voiceprint information, second confidence that the first voice belongs to the second registered user, and further configured to send the first confidence and the second confidence to the server. The second electronic device is further configured to: determine, based on the third voiceprint information, third confidence that the second voice belongs to the first registered user, and determine, based on the fourth voiceprint information, fourth confidence that the second voice belongs to the second registered user; and further configured to send the third confidence and the fourth confidence to the server. The server is configured to receive the first confidence, the second confidence, the third confidence, and the fourth confidence; further configured to: determine, based on the first confidence and the third confidence, fifth confidence that the user is the first registered user, and determine, based on the second confidence and the fourth confidence, sixth confidence that the user is the second registered user; and further configured to determine, based on the fifth confidence and the sixth confidence, that the user is the first registered user or the second registered user.

With reference to the second aspect, in a possible design manner, if determining that the fifth confidence is greater than the sixth confidence, the server determines that the user is the first registered user. If determining that the sixth confidence is greater than the fifth confidence, the server determines that the user is the second registered user.

For a specific method for determining, by the server based on the first confidence and the third confidence, the fifth confidence that the user is the first registered user, and determining, based on the second confidence and the fourth confidence, the sixth confidence that the user is the second registered user, and definition of correction factors, refer to related descriptions in the voiceprint recognition method in the first aspect. Details are not described herein again.

According to a third aspect, an embodiment of this application provides a voiceprint recognition method. The method may include: a server receives first confidence and second confidence from a first electronic device, and receives third confidence and fourth confidence from a second electronic device, where the first confidence is confidence that is determined by the first electronic device and that a voice entered by a user belongs to a first registered user, the second confidence is confidence that is determined by the first electronic device and that the voice entered by the user belongs to a second registered user, the third confidence is confidence that is determined by the second electronic device and that the voice entered by the user belongs to the first registered user, and the fourth confidence is confidence that is determined by the second electronic device and that the voice entered by the user belongs to the second registered user. The server determines, based on the first confidence and the third confidence, fifth confidence that the user is the first registered user, and determines, based on the second confidence and the fourth confidence, sixth confidence that the user is the second registered user. If the fifth confidence is greater than the sixth confidence, the server determines that the user is the first registered user, and if the sixth confidence is greater than the fifth confidence, the server determines that the user is the second registered user. In the method, the server determines a voiceprint recognition result based on the confidence calculated by the plurality of electronic devices, so that impact of voiceprint recognition accuracy of a single electronic device on the voiceprint recognition result can be reduced, and a false entry rate of the voiceprint recognition can be reduced.

With reference to the third aspect, in a possible design manner, that the server determines, based on the first confidence and the third confidence, fifth confidence that the user is the first registered user includes: the server determines the fifth confidence by performing weighted summation on the first confidence and the third confidence. That the server determines, based on the second confidence and the fourth confidence, sixth confidence that the user is the second registered user includes: The server determines the sixth confidence by performing weighted summation on the second confidence and the fourth confidence. In this implementation, the server performs weighted summation on the confidence calculated by the plurality of electronic devices, to obtain the corrected confidence: the fifth confidence and the sixth confidence. In this way, a weight of confidence calculated by each electronic device during weighted summation may be adjusted, so that the corrected confidence is more close to confidence calculated by an electronic device with relatively high reliability. In this way, accuracy of the voiceprint recognition result is improved.

With reference to the third aspect, in a possible design manner, that the server determines, based on the first confidence and the third confidence, fifth confidence that the user is the first registered user, and determines, based on the second confidence and the fourth confidence, sixth confidence that the user is the second registered user includes: the server corrects the first confidence, the second confidence, the third confidence, and the fourth confidence based on a correction factor; the server determines the fifth confidence based on the corrected first confidence and the corrected third confidence; and the server determines the sixth confidence based on the corrected second confidence and the corrected fourth confidence. In this implementation, the server may correct the confidence calculated by the electronic device, and determine the voiceprint recognition result based on the corrected confidence corresponding to the plurality of electronic devices. In this way, impact of voiceprint recognition accuracy of a single electronic device on the voiceprint recognition result can be reduced.

With reference to the third aspect, in a possible design manner, the correction factor includes one or more of a device configuration factor, a voiceprint registration duration factor, and a device usage duration factor, where the device configuration factor is related to a configuration of an electronic device, the voiceprint registration duration factor is related to voiceprint information, and the device usage duration factor is related to usage duration of the electronic device. In this way, a weight of confidence calculated by each electronic device is set based on factors such as the configuration of the electronic device, the voiceprint registration duration, and the device usage duration, so that a weight of confidence calculated by a device with relatively high reliability of a voiceprint recognition result is relatively high, and a weight of confidence calculated by a device with relatively low reliability of a voiceprint recognition result is relatively low.

With reference to the third aspect, in a possible design manner, a larger value of the device configuration factor indicates a higher configuration of the electronic device. A larger value of the voiceprint registration duration factor indicates newer voiceprint information. A larger value of the device usage duration factor indicates shorter use duration of the electronic device.

With reference to the third aspect, in a possible design manner, if the first confidence is greater than the second confidence and the third confidence is greater than the fourth confidence, the server determines that the user is the first registered user; or if the first confidence is less than the second confidence and the third confidence is less than the fourth confidence, the server determines that the user is the second registered user. In other words, if the voiceprint recognition results of the first electronic device and the second electronic device are consistent, it indicates that reliability of the current voiceprint recognition result is relatively high, and a false entry rate is relatively low. In this way, the server determines that the voiceprint recognition result is a voiceprint recognition result determined based on confidence reported by any electronic device. In this case, the server may skip a step of correcting the confidence calculated by the first electronic device and the second electronic device, and performing voiceprint recognition by using the corrected confidence.

With reference to the third aspect, in a possible design manner, if the first confidence is greater than the second confidence and the third confidence is less than the fourth confidence, the server determines, based on the first confidence and the third confidence, the fifth confidence that the user is the first registered user, and determines, based on the second confidence and the fourth confidence, the sixth confidence that the user is the second registered user; or if the first confidence is less than the second confidence and the third confidence is greater than the fourth confidence, the server determines, based on the first confidence and the third confidence, the fifth confidence that the user is the first registered user, and determines, based on the second confidence and the fourth confidence, the sixth confidence that the user is the second registered user. In other words, if the voiceprint recognition results of the first electronic device and the second electronic device are inconsistent, the server corrects the confidence calculated by the first electronic device and the second electronic device, to obtain the corrected confidence, and performs voiceprint recognition by using the corrected confidence.

With reference to the third aspect, in a possible design manner, before that the server determines, based on the first confidence and the third confidence, the fifth confidence that the user is the first registered user, and determines, based on the second confidence and the fourth confidence, the sixth confidence that the user is the second registered user, the server further determines that the first electronic device and the second electronic device belong to a same group. In other words, the server performs voiceprint recognition based on confidence calculated by electronic devices in a same group.

With reference to the third aspect, in a possible design manner, that the first electronic device and the second electronic device belong to the same group includes: the first electronic device and the second electronic device belong to a same local area network, or the first electronic device and the second electronic device are bound to a same account.

According to a fourth aspect, an embodiment of this application provides an electronic device. The electronic device may implement the voiceprint recognition method according to the third aspect, and the method may be implemented by using software, hardware, or hardware executing corresponding software. In a possible design, the electronic device may include a processor and a memory. The processor is configured to support the electronic device in performing a corresponding function in the method according to the third aspect. The memory is configured to be coupled to the processor, and store program instructions and data that are necessary for the electronic device.

According to a fifth aspect, an embodiment of this application provides a computer storage medium. The computer storage medium includes computer instructions, and when the computer instructions are run on an electronic device, the electronic device is enabled to perform voiceprint recognition method according to the third aspect and the possible design manners of the third aspect.

According to a sixth aspect, an embodiment of this application provides a computer program product. When the computer program product runs on a computer, the computer is enabled to perform voiceprint recognition method in the third aspect and the possible design manners of the third aspect.

For technical effects brought by the voiceprint recognition system according to the second aspect, the voiceprint recognition method according to the third aspect, the electronic device according to the fourth aspect, the computer storage medium according to the fifth aspect, and the computer program product according to the sixth aspect, refer to technical effects brought by the foregoing corresponding methods. Details are not described herein again.

DESCRIPTION OF EMBODIMENTS

Figure 1:
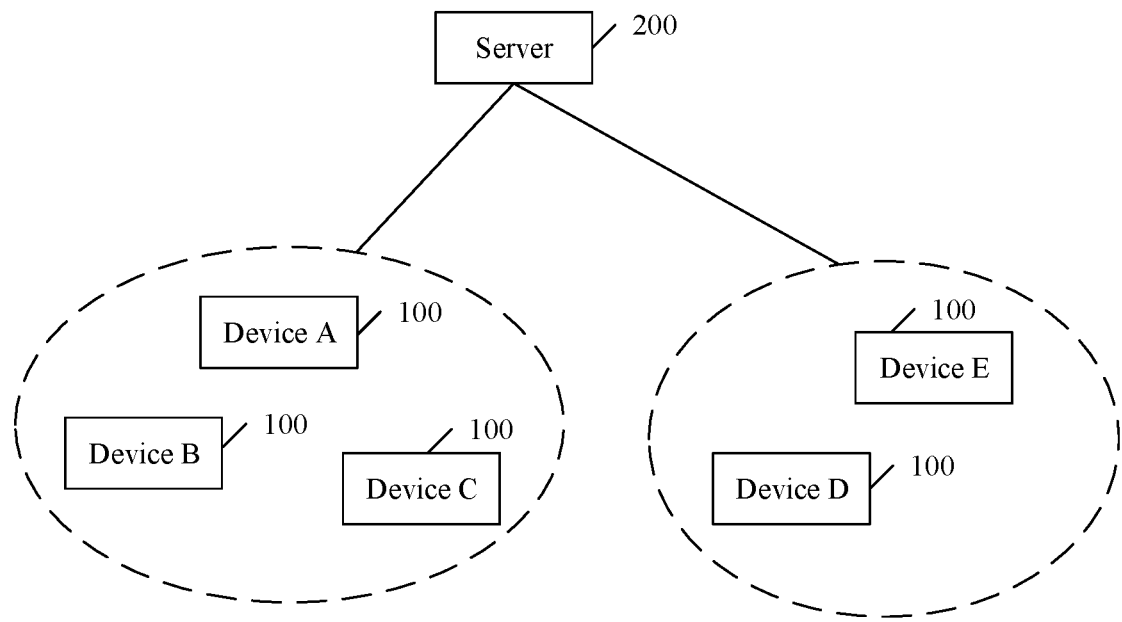
FIG. 1 is a schematic diagram of a system architecture to which a voiceprint recognition method is applicable according to an embodiment of this application.

Before a voiceprint recognition device is used for voiceprint recognition, voiceprint registration needs to be performed. The voiceprint registration means that a user records a segment of voice by using a sound pickup device (for example, a microphone) of a device. For ease of description, in this embodiment of this application, the recorded voice is referred to as a registered voice. The device extracts a voiceprint feature of the registered voice; and establishes and saves a correspondence between the voiceprint feature and the user who records the voice. In this embodiment of this application, for ease of description, the user who performs the voiceprint registration is referred to as a registered user.

The device supports voiceprint registration for a plurality of users. For example, the plurality of users separately record a piece of voice by using the sound pickup device of the device. For example, a user 1 records a voice 1, a user 2 records a voice 2, and a user 3 records a voice 3. The device extracts a voiceprint feature of each segment of voice (e.g., the voice 1, the voice 2, and the voice 3). Further, the device establishes and stores a correspondence between a voiceprint feature of the voice 1 and the user 1, establishes and stores a correspondence between a voiceprint feature of the voice 2 and the user 2, and establishes and stores a correspondence between a voiceprint feature of the voice 3 and the user 3. In this way, the device stores correspondences between the plurality of users and voiceprint features extracted from registered voices of the users, and these users are registered users on the device.

By using the registered voice, the device may perform voiceprint recognition on a received voice, so as to determine a registered user to which the received voice belongs. For example, after receiving a voice of a user, the device extracts a voiceprint feature of the voice. The device obtains a voiceprint feature of a registered voice of each registered user. The device compares the voiceprint feature of the received voice of the user with the voiceprint feature of the registered voice of each registered user, to obtain a matching degree between the voiceprint feature of the received voice of the user and the voiceprint feature of the registered voice of each registered user. In other words, confidence that the received voice belongs to each registered user is obtained.

Optionally, before the voiceprint recognition is performed, the device may pre-process the received voice, for example, the device may perform noise reduction processing, echo cancellation, or voice enhancement. In other words, the device may perform voiceprint recognition after preprocessing the received voice, or may skip a preprocessing step, and directly perform voiceprint recognition on the received voice.

Optionally, before performing the voiceprint recognition, the device may determine whether the voice is a valid voice, and then perform voiceprint recognition only on the valid voice. For example, the device may determine the valid voice based on energy of the voice. Specifically, if determining that the energy of the voice is greater than a first value, the device determines that the voice is the valid voice, and the device may further perform voiceprint recognition on the valid voice. If determining that the energy of the voice is less than or equal to the first value, the device determines that the voice is an invalid voice, and does not perform voiceprint recognition on the voice. It may be understood that the device may alternatively determine the valid voice based on another condition. For example, if the voice is a human voice, the device determines that the voice is the valid voice. If the voice is a non-human voice, the device determines that the voice is the invalid voice. In other words, the device may perform voiceprint recognition on only the valid voice, or may skip the foregoing step of determining the valid voice and the invalid voice, and perform voiceprint recognition on all voices.

For ease of description, a voice used by the device to perform voiceprint recognition is referred to as an entered voice in this embodiment of this application. In other words, the device extracts a voiceprint feature of the entered voice, compares the voiceprint feature with a voiceprint feature of each registered voice in the device, and obtains, through calculation, confidence that the entered voice belongs to each registered user. For a method for extracting the voiceprint feature and a method for calculating the confidence, refer to descriptions in the conventional technology. Details are not described again in this embodiment of this application.

The confidence may be a score, and a higher score indicates a higher degree of matching between the entered voice and the voiceprint feature of the registered voice. In other words, reliability that the entered voice belongs to the registered user is higher. It may be understood that a representation form of the confidence is not limited in this embodiment of this application. The confidence may alternatively be described as a confidence probability, a confidence score, a trust score, or the like, and is used to represent a confidence value of a voiceprint recognition result. For ease of description, the confidence is uniformly described in the embodiments of this application.

The device may determine, based on confidence that the entered voice belongs to each registered user, a user to which the entered voice belongs. For example, if confidence that the entered voice belongs to the user 1 is higher than confidence that the entered voice belongs to another registered user, the device determines that the entered voice belongs to the user 1. Optionally, the device may further set a confidence threshold. If confidence that the entered voice belongs to each registered user is less than or equal to a confidence threshold, the device determines that the entered voice does not belong to any registered user.

For example, a plurality of registered users on a device A perform voiceprint registration. For example, the registered users on the device A include the user 1, the user 2, the user 3, a user 4, a user 5, and a user 6.

After receiving a voice of a user, the device A performs voiceprint recognition on the entered voice, to obtain confidence $con_{A1}$ that the entered voice belongs to the user 1, confidence $con_{A2}$ that the entered voice belongs to the user 2, confidence $con_{A3}$ that the entered voice belongs to the user 3, confidence $con_{A4}$ that the entered voice belongs to the user 4, confidence $con_{A5}$ that the entered voice belongs to the user 5, and confidence $con_{A6}$ that the entered voice belongs to the user 6.

For example, if $con_{A1}$, $con_{A2}$, and $con_{A3}$ are greater than the confidence threshold, and $con_{A1} > con_{A2} > con_{A3}$, the device A determines that the received voice belongs to the user 1. In other words, the voiceprint recognition result indicates the user 1.

For example, if $con_{A1}$, $con_{A2}$, $con_{A3}$, $con_{A4}$, $con_{A5}$, and $con_{A6}$ are all less than the confidence threshold, the device A determines that the received voice does not belong to the registered user.

However, during a voiceprint recognition process, the device may encounter a false entry. If the false entry occurs, the user may worry about personal privacy leakage. Therefore, information security cannot be ensured, and user experience is poor.

It may be understood that, due to impact of a plurality of factors, the devices have different false entry rates in voiceprint recognition. In other words, the devices have different capabilities of performing voiceprint recognition.

For example, a voiceprint recognition capability of the voiceprint recognition device varies based on a configuration of the device. For example, the device A includes two high-performance microphones, and a device B includes one high-performance microphone. In this case, a configuration of the device A is higher than a configuration of the device B, and a capability of performing voiceprint recognition by the device A is greater than a capability of performing voiceprint recognition by the device B. A probability that a false entry occurs when the device A performs voiceprint recognition is less than a probability that a false entry occurs when the device B performs voiceprint recognition.

For another example, aging of the voiceprint recognition device increases a false entry rate when the device performs the voiceprint recognition. For example, if the microphone of the device A ages, and performance of the microphone deteriorates, a false entry rate when the device A performs voiceprint recognition increases.

For another example, duration for which the user performs voiceprint registration on the device affects a false entry rate when the device performs voiceprint recognition. For example, the user 1 performs voiceprint registration on the device A three years ago. The voice (a voiceprint feature of the voice) of the user 1 has changed in 3 years (e.g., if the user 1 is a teenager, the voice of the user 1 changes to a greater extent). When the device A performs voiceprint recognition on the voice of the user 1, there is a relatively high false entry rate. The user 2 performs voiceprint recognition on the device A two months ago. Within 2 months, the voice of the user 2 changed slightly. When the device A performs voiceprint recognition on the voice of the user 2, there is a relatively low false entry rate.

For another example, when a user enters a voice, a sound pickup effect of the device varies based on a distance between the user and the device. This affects a false entry rate when the device performs voiceprint recognition. For example, when the user 1 enters a voice, a distance between the user 1 and the device A is relatively short, and a sound pickup effect of a sound pickup device of the device A is relatively good. When the user 1 enters a voice, a distance between the user 1 and the device B is relatively long, and a sound pickup effect of a sound pickup device of the device B is relatively poor. If other factors are the same, a false entry rate when the device A performs voiceprint recognition on the voice of the user 1 is smaller than a false entry rate when the device B performs voiceprint recognition on the voice of the user 1.

A capability of performing voiceprint recognition by each device is affected by a plurality of factors. When the user enters the voice, if a single device is used for voiceprint recognition, a recognition result may be inaccurate. In some scenarios, a false entry rate when the device A performs voiceprint recognition is less than a false entry rate when the device B performs voiceprint recognition. For example, duration for which the user 1 performs voiceprint registration on the device A is the same as duration for which the user 1 performs voiceprint registration on the device B, and a configuration of the device A is higher than a configuration of the device B. When the user 1 enters the voice, a false entry rate when the device A performs voiceprint recognition is less than a false entry rate when the device B performs voiceprint recognition. In this case, if the device B is used for voiceprint recognition, the recognition result may be incorrect. In other scenarios, a false entry rate when the device A performs voiceprint recognition is greater than a false entry rate when the device B performs voiceprint recognition. For example, duration for which the user 2 performs voiceprint registration on the device A is three years, and duration for which the user 2 performs voiceprint registration on the device B is one month. When the user 2 enters a voice, the false entry rate when the device A performs voiceprint recognition is greater than the false entry rate when the device B performs voiceprint recognition. In this case, if the device A is used for voiceprint recognition, the recognition result may be incorrect.

Embodiments of this application provide a voiceprint recognition method, and a voiceprint recognition result of an entered voice is determined based on confidence of a plurality of devices, so that a false entry rate of voiceprint recognition can be effectively reduced. For example, as shown in FIG. 1, the voiceprint recognition method provided in this embodiment of this application may be applied to a system architecture shown in FIG. 1.

The system may include a plurality of devices 100. The device 100 supports voiceprint recognition, and may be a smart home device (such as a sound box, a smart refrigerator, or a smart television), a mobile phone, a laptop, a personal computer (PC), a wearable electronic device (such as a smart watch, smart glasses, or a smart helmet), a tablet computer, an augmented reality (AR)\ virtual reality (VR)

device, an in-vehicle computer, or the like. It may be understood that a specific form of the device 100 is not specifically limited in this embodiment of this application.

Figure 2:
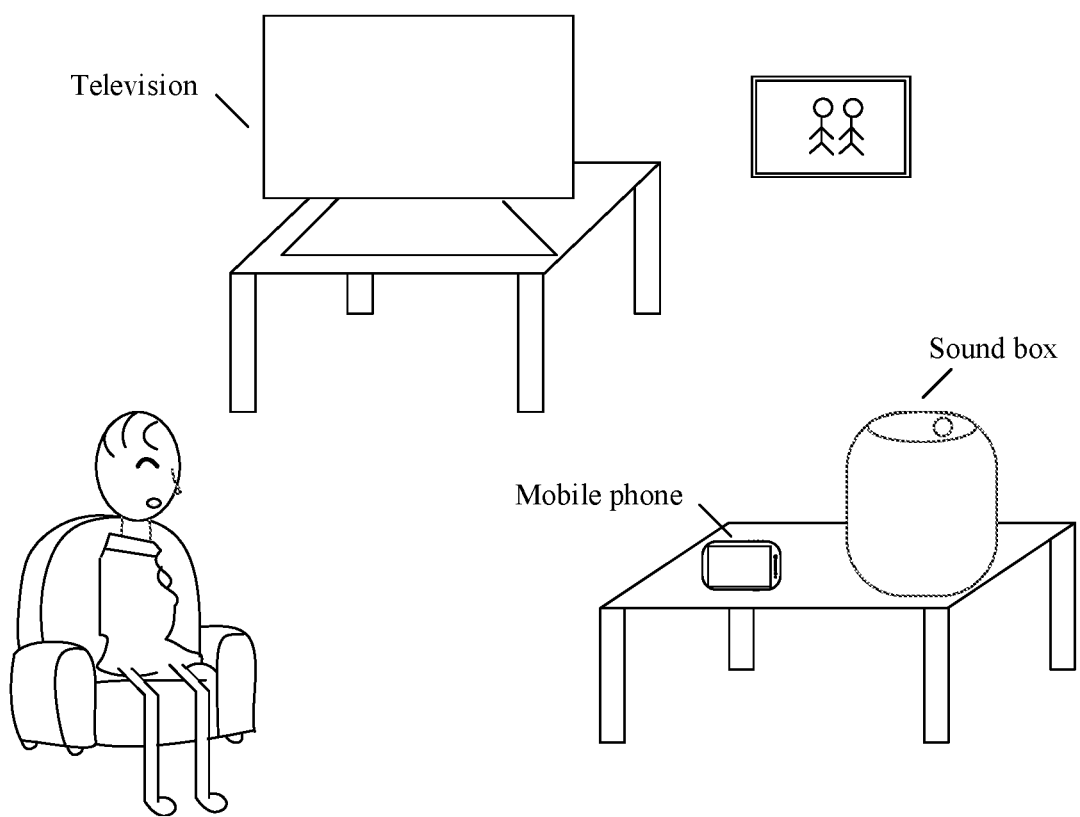
FIG. 2 is a schematic diagram of a scenario instance of a voiceprint recognition method according to an embodiment of this application.

The plurality of devices 100 may be grouped into one or more groups based on space in which the devices are located. For example, in this embodiment of this application, devices 100 that belong to a same space are grouped into a same group. For example, the device A, the device B, and a device C belong to first space, and a device D and a device E belong to second space. In this case, the device A, the device B, and the device C belong to a first group, and the device D and the device E belong to a second group. It may be understood that when a user sends a voice in space, a plurality of devices 100 belonging to the space may receive the voice, as depicted in FIG. 2. There are three devices that support voiceprint recognition in one room: a mobile phone, a sound box, and a television. When a user makes a voice in a room, the mobile phone, the sound box, and the television can receive the voice. In this case, the mobile phone, the sound box, and the television belong to the same group.

Referring back to FIG. 1, the system may further include a server 200. The server 200 may be a cloud service.

The server 200 is connected to the devices 100 in a wireless manner or a wired manner.

For example, the device A, the device B, and the device C access a first wireless local area network, and the device D and the device E access a second wireless local area network. The first wireless local area network and the second wireless local area network access an internet in which the server 200 is located. Therefore, each device 100 may communicate with the server 200.

The server 200 may be configured to determine a voiceprint recognition result of the entered voice (namely, an identity of the user who makes the voice) based on confidence of the plurality of devices 100.

For example, after receiving the voice of the user, the devices 100 in the same space may separately obtain confidence through calculation based on the entered voice. The plurality of devices 100 separately report, to the server 200, data such as the confidence obtained by the plurality of devices 100. After receiving the data reported by the plurality of devices 100 within preset duration (for example, 0.1 second), the server 200 determines a plurality of devices 100 that belong to a same group, and determines a voiceprint recognition result of the entered voice based on the data reported by the plurality of devices 100 that belong to the same group.

In an implementation, the server may determine, based on a network segment, devices that belong to a same group. If determining that a plurality of devices 100 belong to a same network segment (a same local area network), the server 200 determines that the plurality of devices 100 belong to the same group. For example, it is assumed that the device A, the device B, and the device C belong to a network segment 1, and the device D belongs to a network segment 2. When receiving, within 0.1 second, data reported by the device A, the device B, the device C, and the device D, the server 200 determines that the device A, the device B, and the device C belong to the network segment 1, and the device D belongs to the network segment 2, and determines that the device A, the device B, and the device C belong to a same group. For example, it is assumed that the device A, the device B, and the device C belong to the network segment 1, and the device D belongs to the network segment 2. The server 200 receives, within 0.1 second, data reported by the device A, the device B, and the device D, and receives, within a next 0.1 second, data reported by the device C. The server determines that the device A and the device B belong to the network segment 1, and that the device D belongs to the network segment 2, and determines that the device A and the device B belong to a same group.

In another implementation, the server may determine, based on an associated user account, devices that belong to a same group. If determining that the plurality of devices 100 belong to devices bound to a same user account, the server determines that the plurality of devices 100 belong to a same group.

It may be understood that the foregoing implementations are merely two specific examples. In actual application, the server may determine, in another manner, whether data reported by a plurality of devices belongs to data reported by devices in a same space. This is not limited in this embodiment of this application.

It should be noted that a function of the server 200 in this embodiment of this application may alternatively be implemented by another apparatus, for example, a device in a local area network or the device 100, provided that the apparatus can obtain data reported by devices 100 in a same group and support a voiceprint recognition function, This is not limited in this application. In the following embodiments, an example in which the server 200 implements a corresponding function is used for description.

Figure 3A:
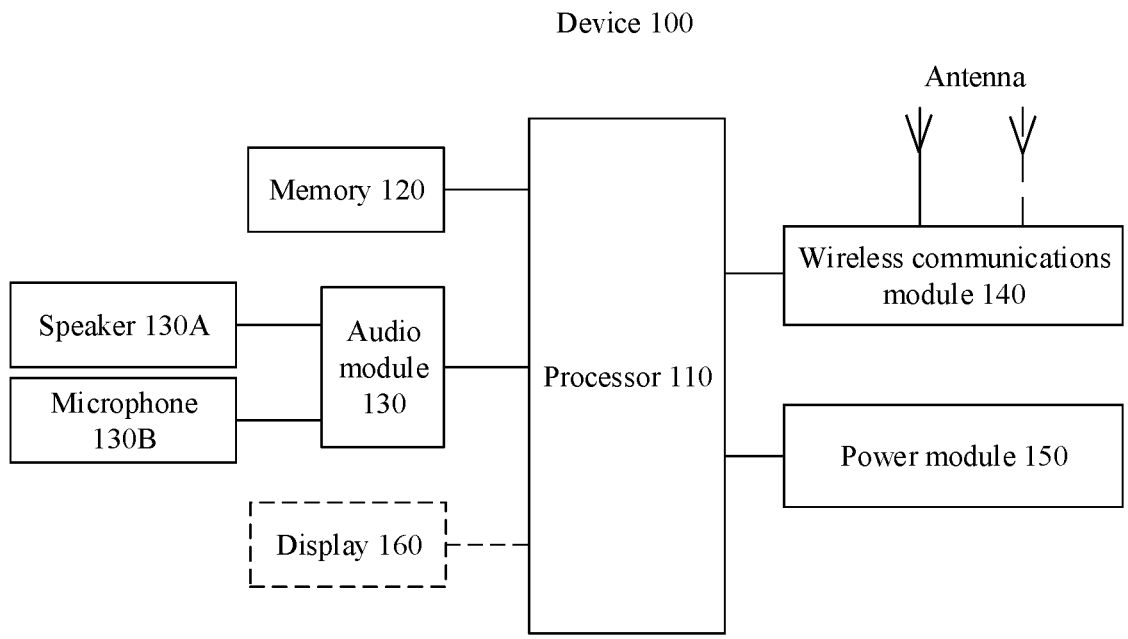
FIG. 3A is a schematic composition diagram of a hardware structure of an electronic device according to an embodiment of this application.

FIG. 3A is a schematic diagram of a structure of a device 100 according to an embodiment of this application. The device 100 may include a processor 110, a memory 120, an audio module 130, a speaker 130A, a microphone 130B, a wireless communications module 140, a power module 150, and the like.

It can be understood that the structure shown in this embodiment of the present invention does not constitute a specific limitation on the device 100. In some other embodiments of this application, the device 100 may include more or fewer components than those shown in the figure, or combine some components, or split some components, or have different component arrangements. The components shown in the figure may be hardware, software, or a combination of software and hardware.

The processor 110 may include one or more processors. For example, the processor 110 may include an application processor (AP), a controller, a digital signal processor (DSP), or the like. Different processors may be independent components, or may be integrated into one or more processors.

The controller may be a nerve center and a command center of the device 100. The controller may generate an operation control signal based on instruction operation code and a time sequence signal, to complete control of instruction reading and instruction execution.

An operating system of the device 100 may be installed on the application processor, and is configured to manage hardware and software resources of the device 100, for example, manage and configure memory, prioritize system resource supply and demand, control input and output devices, operate networks, manage file systems, and manage drivers. The operating system may also be configured to provide an operating interface for a user to interact with the system. Various types of software, such as a driver and an application (app), may be installed in the operating system.

The memory 120 is configured to store an instruction and data. In some embodiments, the memory 120 is a cache memory. The memory may store instructions or data used or cyclically used by the processor 110. If the processor 110 needs to use the instructions or the data again, the processor 110 may directly invoke the instructions or the data from the memory 120, to avoid repeated access and reduce a waiting time of the processor 110. In this way, system efficiency is improved.

The memory 120 may further store an address used to uniquely identify the device 100, and store an address of another apparatus (for example, a server).

In some embodiments, the memory 120 may alternatively be disposed in the processor 110. In other words, the processor 110 includes the memory 120. This is not limited in this embodiment of this application.

The device 100 may implement an audio function, for example, music playing and recording, by using an audio module 130, a speaker 130A, a microphone 130B, an application processor, and the like. In this embodiment of this application, the device 100 may implement a function of receiving a user voice by using the audio module 130, the microphone 130B, the application processor, and the like. The device 100 may implement a voice playing function, for example, prompt voice playing, by using the audio module 130, the speaker 130A, the application processor, and the like.

The audio module 130 is configured to convert digital audio information into an analog audio signal output, and is also configured to convert an analog audio input into a digital audio signal. The audio module 130 may be further configured to code and decode an audio signal. In some embodiments, the audio module 130 may be disposed in the processor 110, or some function modules in the audio module 130 are disposed in the processor 110.

The speaker 130A, also referred to as a "horn", is configured to convert an audio electrical signal into a sound signal.

The microphone 130B, also referred to as a "mic" or a "microphone", is configured to convert a sound signal into an electrical signal. The user may make a sound by approaching the microphone 130B through a human mouth, and input the sound signal to the microphone 130B.

The wireless communications module 140 may provide a wireless communication applied to the device 100 through a wireless local area network (WLAN) (for example, a wireless fidelity (Wi-Fi) network), Bluetooth (BT), a global navigation satellite system (GNSS), frequency modulation (FM), NFC, an infrared (IR) technique, ZigBee, or the like. For example, the wireless communications module 140 may be configured to implement communication between the device 100 and the server 200 in this embodiment of this application. The wireless communications module 140 may be one or more devices integrating at least one communications processing module. The wireless communications module 140 receives an electromagnetic wave through an antenna, performs frequency modulation and filtering processing on the electromagnetic wave signal, and sends the processed signal to the processor 110. The wireless communications module 140 may further receive a to-be-sent signal from the processor 110, perform frequency modulation and amplification on the to-be-sent signal, and convert the signal into an electromagnetic wave through an antenna and radiate the signal.

The power module 150 may be configured to supply power to each component included in the device 100. In some embodiments, the power module 150 may be a battery such as a rechargeable battery.

In some embodiments, the device 100 may further include a display 160. The display 160 is configured to display an image, a video, and the like. The display 160 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the device 100 may include one or N displays 160, where N is a positive integer greater than 1.

Figure 3B:
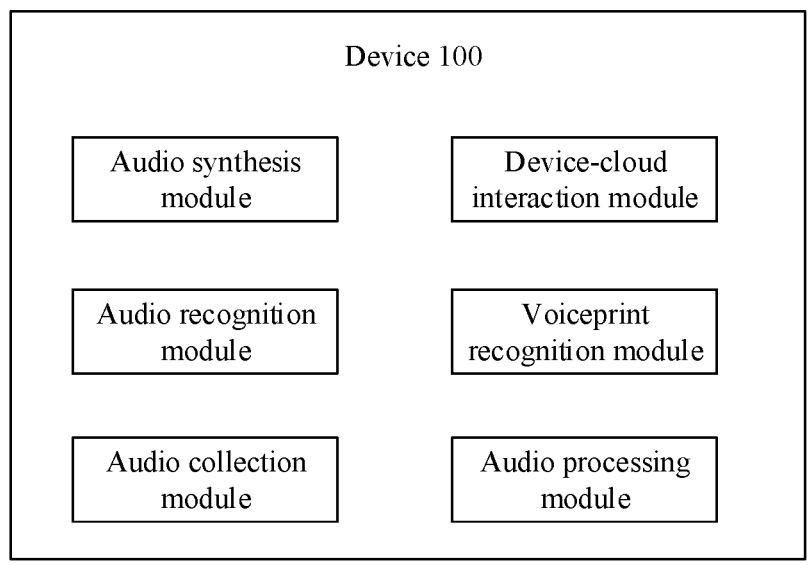
FIG. 3B is a schematic diagram of a structure of software of an electronic device according to an embodiment of this application.

It may be understood that when implementing the voiceprint recognition method provided in this embodiment of this application, the device 100 may be divided into different software modules. For example, in FIG. 3B, the device 100 provided in this embodiment of this application may include software modules such as an audio collection module, an audio processing module, an audio recognition module, a voiceprint recognition module, an audio synthesis module, and a device-cloud interaction module.

The audio collection module is configured to obtain audio data, and is responsible for storing and forwarding the obtained audio data. For example, the microphone 130B receives a voice of a user, and converts the voice into audio data by using the audio module 130. The audio collection module periodically obtains the audio data from a data buffer, stores the audio data, and forwards the audio data to other modules.

The audio processing module is configured to process the audio data obtained by the audio collection module, for example, perform preprocessing such as noise reduction on the received voice data.

The audio recognition module is configured to perform voice recognition on the processed audio data, for example, recognize a wake-up word, recognize a voice instruction, and the like.

The voiceprint recognition module is configured to perform voiceprint recognition on the processed audio data. In this embodiment of this application, the voiceprint recognition module may be configured to: extract a voiceprint feature on the entered voice, and calculate confidence that the entered voice belongs to each registered user; and may also determine a voiceprint recognition result.

The audio synthesis module is configured to synthesize and play the audio data, for example, may synthesize a command of the server into audio data, and perform voice broadcast through the speaker 130A.

The device-cloud interaction module is configured to communicate between the device 100 and another apparatus, for example, control data interaction between the device 100 and the server 200.

Figure 4:
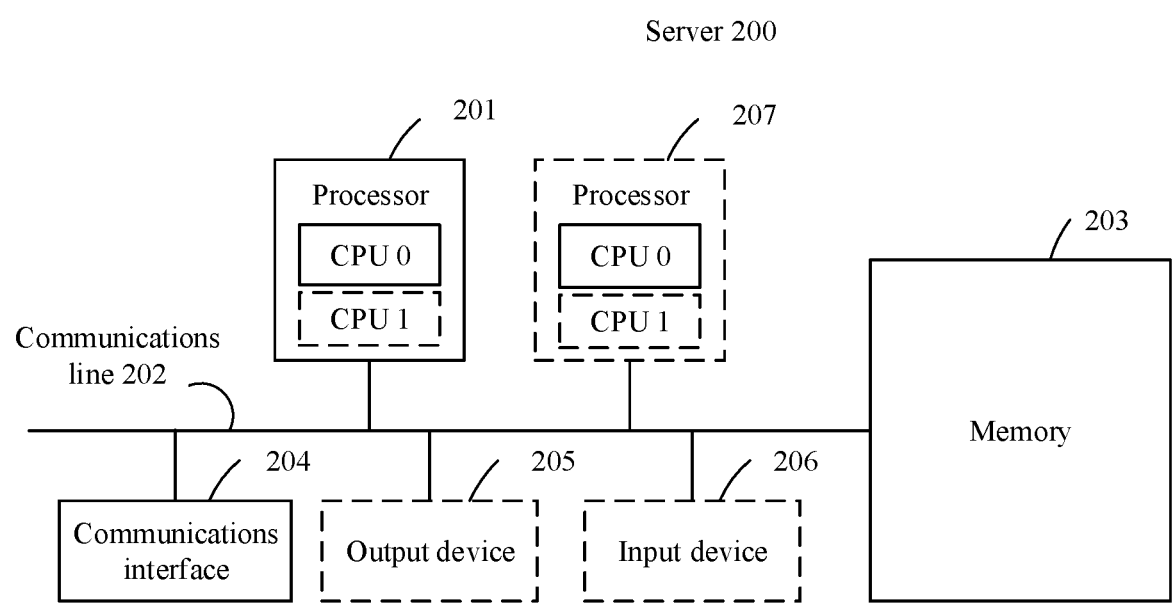
FIG. 4 is a schematic composition diagram of a hardware structure of a server according to an embodiment of this application.

FIG. 4 is a schematic diagram of a structure of a server 200 according to an embodiment of this application. The server 200 includes at least one processor 201, a communications line 202, a memory 203, and at least one communications interface 204.

The processor 201 may be a general-purpose central processing unit (CPU), a microprocessor, an application-specific integrated circuit (ASIC), or one or more integrated circuits that are configured to control execution of a program in the solutions of this application.

The communications line 202 may include a path for transmitting information between the foregoing components.

The communications interface 204 uses any apparatus such as a transceiver, to communicate with another device or a communications network, for example, the Ethernet, a radio access network (RAN), or a wireless local area network (WLAN).

The memory 203 may be a read-only memory (ROM) or another type of static storage device that can store static information and instructions, or random access memory (RAM) or another type of dynamic storage device that can store information and instructions. The memory 203 may alternatively be an electrically erasable programmable read-only memory (EEPROM) and a compact disc read-only memory (CD-ROM) or another compact disc storage, optical disc storage (including a compact disc, a laser disc, an optical disc, a digital versatile disc, a Blu-ray optical disc, and the like) and a magnetic disk storage medium or another magnetic storage device. The memory 203 may alternatively be any other medium that can be used to carry or store expected program code in a form of an instruction or a data structure and that can be accessed by a computer, but is not limited thereto. The memory 203 may exist independently, and be connected to the processor 201 by using the communications line 202. Alternatively, the memory 203 may be integrated with the processor 201.

The memory 203 is configured to store computer-executable instructions for executing the solutions of this application, and the processor 201 controls the execution. The processor 201 is configured to execute the computer-executable instructions stored in the memory 203, to implement the voiceprint recognition method provided in the following embodiments of this application.

Optionally, the computer-executable instructions in the embodiments of this application may also be referred to as application program code. This is not specifically limited in the embodiments of this application.

During specific implementation, in an embodiment, the processor 201 may include one or more CPUs, for example, a CPU 0 and a CPU 1 in FIG. 4.

During specific implementation, in an embodiment, the server 200 may include a plurality of processors, for example, the processor 201 and a processor 207 in FIG. 4. Each of the processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the server 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive an input from a user in a plurality of manners. For example, the input device 206 may be a mouse, a keyboard, a touchscreen device, or a sensing device.

The server 200 may be a general-purpose device or a dedicated device. In specific implementation, the server 200 may be a desktop computer, a laptop computer, a network server, a personal digital assistant (PDA), a mobile phone, a tablet computer, a wireless terminal device, an embedded device, or a device having a structure similar to that shown in FIG. 4. A type of the server 200 is not limited in this embodiment of this application.

The following specifically describes the voiceprint recognition method provided in the embodiments of this application with reference to the accompanying drawings.

Figure 5:
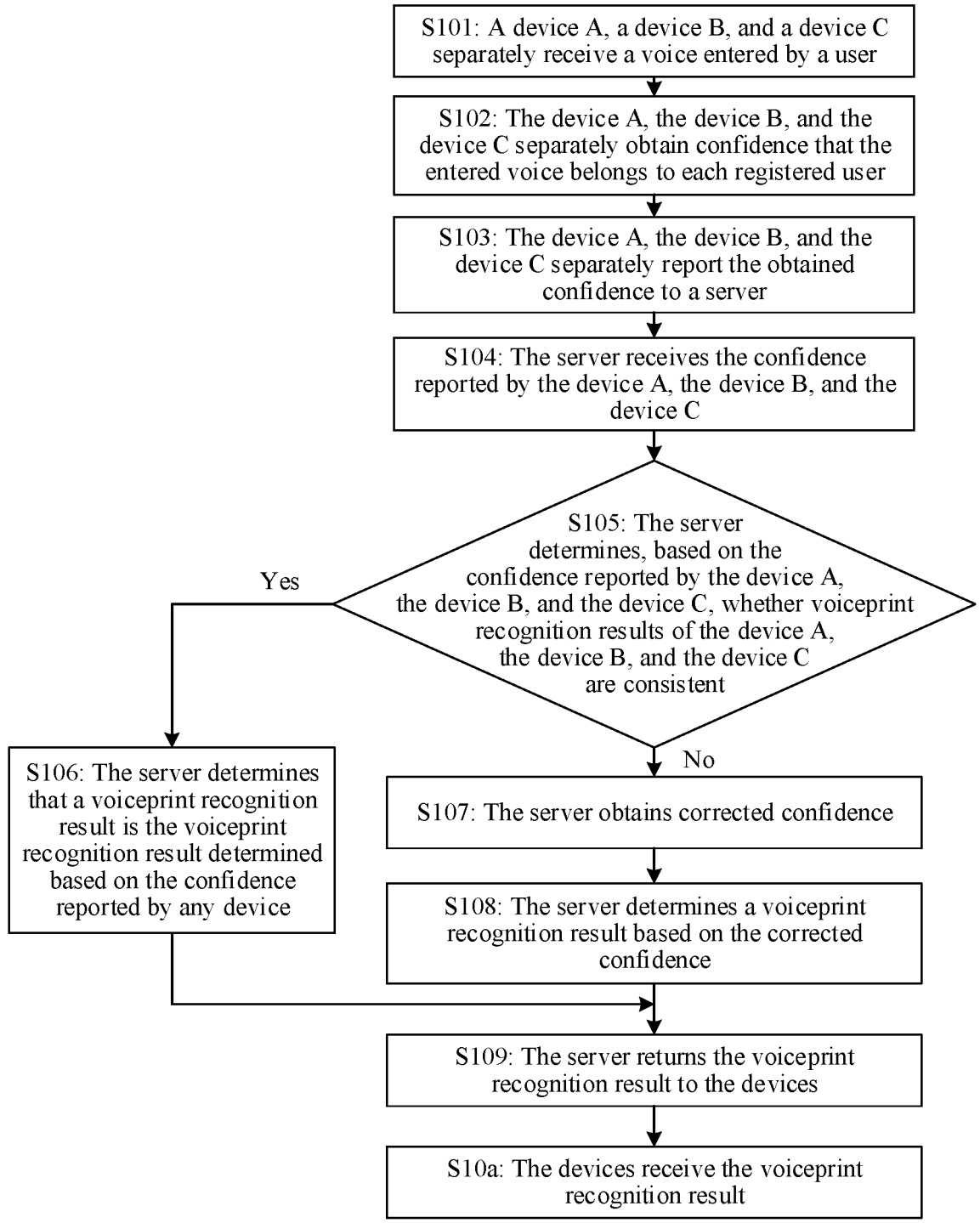
FIG. 5 is a flowchart of a voiceprint recognition method according to an embodiment of this application.

An embodiment of this application provides a voiceprint recognition method. As shown in FIG. 5, the method may include the following steps.

S101: A device A, a device B, and a device C respectively receive a voice input by a user.

The user makes a voice in space. A group of devices in the space respectively receive the voice entered by the user. For example, the user speaks a wake-up word "Xiaoyi Xiaoyi" in a room shown in FIG. 2, and a mobile phone, a sound box, and a television in the room all receive the voice entered by the user. For example, the mobile phone is the device A, the sound box is the device B, and the television is the device C. The device A, the device B, and the device C receive the voice entered by the user respectively. In an implementation, the device A, the device B, and the device C respectively preprocess the received voice to obtain a valid voice.

It should be noted that this embodiment of this application is described by using an example in which first space includes three devices: the device A, the device B, and the device C. In actual application, a group of devices may include two or more devices. A specific quantity of a group of devices is not limited in this application.

S102: The device A, the device B, and the device C respectively obtain confidence that the entered voice belongs to each registered user.

One or more registered users have performed voiceprint registration on the device A, the device B, and the device C. The registered users on the device A, the device B, and the device C may be the same or different. After receiving the voice of the user, the device A, the device B, and the device C respectively calculate confidence that the entered voice belongs to each registered user.

For example, registered users on the device A include a user 1, a user 2, a user 3, a user 4, a user 5, and a user 6. Registered users on the device B include the user 1, the user 2, the user 3, the user 4, a user 7, and a user 8. Registered users on the device C include the user 1, the user 2, the user 3, the user 4, and a user 9. The registered users on the device A, the device B, and the device C are different.

The device A obtains confidence $con_{A1}$ that the entered voice belongs to the user 1, confidence $con_{A2}$ that the entered voice belongs to the user 2, confidence $con_{A3}$ that the entered voice belongs to the user 3, confidence $con_{A4}$ that the entered voice belongs to the user 4, confidence $con_{A5}$ that the entered voice belongs to the user 5, and confidence $con_{A6}$ that the entered voice belongs to the user 6.

The device B obtains confidence $con_{B1}$ that the entered voice belongs to the user 1, confidence $con_{B2}$ that the entered voice belongs to the user 2, confidence $con_{B3}$ that the entered voice belongs to the user 3, confidence con that the entered voice belongs to the user 4, confidence $con_{B7}$ that the entered voice belongs to the user 7, and confidence cons that the entered voice belongs to the user 8.

The device C obtains confidence $con_{C1}$ that the entered voice belongs to the user 1, confidence $con_{C2}$ that the entered voice belongs to the user 2, confidence $con_{C3}$ that the entered voice belongs to the user 3, confidence $con_{C4}$ that the entered voice belongs to the user 4, and confidence $con_{c9}$ that the entered voice belongs to the user 9.

For another example, registered users on the device A include a user 1, a user 2, a user 3, a user 4, a user 5, and a user 6. Registered users on the device B include the user 1, the user 2, the user 3, the user 4, the user 5, and the user 6. Registered users on the device C include the user 1, the user 2, the user 3, the user 4, the user 5, and the user 6. The registered users on the device A, the device B, and the device C are the same.

The device A obtains confidence $con_{A1}$ that the entered voice belongs to the user 1, confidence $con_{A2}$ that the entered voice belongs to the user 2, confidence $con_{A3}$ that the entered voice belongs to the user 3, confidence $con_{A4}$ that the entered voice belongs to the user 4, confidence $con_{A5}$ that the entered voice belongs to the user 5, and confidence $con_{A6}$ that the entered voice belongs to the user 6.

The device B obtains confidence $con_{B1}$ that the entered voice belongs to the user 1, confidence $con_{B2}$ that the entered voice belongs to the user 2, confidence $con_{B3}$ that the entered voice belongs to the user 3, confidence $con_{B4}$ that the entered voice belongs to the user 4, confidence $con_{B5}$ that the entered voice belongs to the user 5, and confidence $con_{B6}$ that the entered voice belongs to the user 6.

The device C obtains confidence $con_{C1}$ that the entered voice belongs to the user 1, confidence $con_{C2}$ that the entered voice belongs to the user 2, confidence $con_{C3}$ that the entered voice belongs to the user 3, confidence $con_{C4}$ that the entered voice belongs to the user 4, confidence $con_{c5}$ that the entered voice belongs to the user 5, and confidence conch that the entered voice belongs to the user 6.

S103: The device A, the device B, and the device C separately report the obtained confidence to a server.

In an implementation, the device A, the device B, and the device C respectively sort, in descending order of confidence, the confidence obtained by the device A, the device B, and the device C. For example, a larger confidence value indicates higher confidence.

Further, the device A, the device B, and the device C separately report one or more pieces of confidence data according to a preset rule.

In an implementation, the device reports, to the server, top N pieces of data in data whose confidence value is greater than a first confidence threshold and that is arranged in descending order of confidence. N is greater than or equal to 2. In some scenarios, if a quantity of pieces of data whose confidence value is greater than the first confidence threshold and that are obtained by the device is M (M>0), and M is less than N, the device reports the M pieces of data to the server.

For example, the first confidence threshold is 0.5, and N=3. It should be noted that the confidence threshold in this embodiment of this application may be a percentage, a decimal, or an integer. This is not limited in this application.

In the confidence data obtained by the device A, four pieces of data whose confidence value is greater than the first confidence threshold include: $con_{A1}$, $con_{A2}$, $con_{A3}$, and $con_{A4}$. In addition, top three pieces of data arranged in descending order of confidence are $con_{A1}$, $con_{A2}$, and $con_{A3}$. In this case, the device A reports, to the server, the confidence $con_{A1}$ that the entered voice belongs to the user 1, the confidence $con_{A2}$ that the entered voice belongs to the user 2, and the confidence $con_{A3}$ that the entered voice belongs to the user 3.

In the confidence data obtained by the device B, three pieces of data whose confidence value is greater than the first confidence threshold include: $con_{B1}$ $con_{B2}$, and $con_{B4}$. In addition, first three pieces of data arranged in descending order of confidence are $con_{B1}$, $con_{B2}$, and $con_{B4}$. In this case, the device B reports, to the server, the confidence $con_{B1}$ that the entered voice belongs to the user 1, the confidence $con_{B2}$ that the entered voice belongs to the user 2, and the confidence $con_{B4}$ that the entered voice belongs to the user 4.

In the confidence data obtained by the device C, two pieces of data whose confidence value is greater than the first confidence threshold include: $con_{C1}$ and $con_{C2}$. The device C reports, to the server, the confidence $con_{C1}$ that the entered voice belongs to the user 1, and the confidence $con_{C2}$ that the entered voice belongs to the user 2.

S104: The server receives confidence reported by the device A, the device B, and the device C.

In an implementation, the server receives, within preset duration, the confidence data reported by the device A, the device B, and the device C, and determines that the device A, the device B, and the device C belong to a same group.

Optionally, the device A, the device B, and the device C may report their respective registered users (for example, user identifiers of the registered users) when reporting their respective confidence, so that the server obtains the registered users on each device.

It should be noted that the server may obtain the registered user of each device in another manner. For example, in another implementation, the device may report a voiceprint registration event to the server when receiving an operation of performing voiceprint registration on the device by the registered user. The server may determine the registered user on each device based on the received voiceprint registration event, and store information about the registered user on each device.

S105: The server determines, based on the confidence reported by the device A, the device B, and the device C, whether voiceprint recognition results of the device A, the device B, and the device C are consistent.

If voiceprint recognition results separately determined based on the confidence reported by the device A, the device B, or the device C are consistent, for example, if the server determines, based on the confidence data reported by the device A, that the entered voice is a voice of the user 1 (in other words, the voiceprint recognition result of the device A is the user 1), determines, based on the confidence data reported by the device B, that the entered voice is the voice of the user 1 (in other words, the voiceprint recognition result of the device B is the user 1), and determines, based on the confidence data reported by the device C, that the entered voice is the voice of the user 1 (in other words, the voiceprint recognition result of the device C is the user 1), the server performs step S106 to determine that the voiceprint recognition result is the voiceprint recognition result determined based on the confidence reported by any device.

If voiceprint recognition results of the device A, the device B, or the device C are inconsistent, for example, if the server determines, based on the confidence data reported by the device A, that the entered voice is the voice of the user 1 (in other words, the voiceprint recognition result of the device A is the user 1), determines, based on the confidence data reported by the device B, that the entered voice is the voice of the user 1 (in other words, the voiceprint recognition result of the device B is the user 1), and determines, based on the confidence data reported by the device C, that the entered voice is the voice of the user 2 (in other words, the voiceprint recognition result of the device C is the user 2), the server performs steps S107 and S108, to correct the confidence obtained by the devices by using the correction factors, and perform voiceprint recognition by using the corrected confidence.

S106: The server determines that a voiceprint recognition result is the voiceprint recognition result determined based on the confidence reported by any device.

For example, the data reported by the device A is the confidence $con_{A1}$ that the entered voice belongs to the user 1, the confidence $con_{A2}$ that the entered voice belongs to the user 2, and the confidence $con_{A3}$ that the entered voice belongs to the user 3. The data reported by the device B is the confidence $con_{B1}$ that the entered voice belongs to the user 1, the confidence $con_{B2}$ that the entered voice belongs to the user 2, and the confidence $con_{B4}$ that the entered voice belongs to the user 4. The data reported by the device C is the confidence $con_{C1}$ that the entered voice belongs to the user 1, and the confidence $con_{C2}$ that the entered voice belongs to the user 2. If $con_{A1}>con_{A2}$, and $con_{A1}>con_{A3}$, the server determines, based on the confidence data reported by the device A, that the entered voice is the voice of the user 1 (in other words, the voiceprint recognition result of the device A is the user 1). If $con_{B1}>con_{B2}$, and $con_{B1}>con_{B4}$, the server determines, based on the confidence data reported by the device B, that the entered voice is the voice of the user 1 (in other words, the voiceprint recognition result of the device B is the user 1). If $con_{C1}>con_{C2}$, the server determines, based on the confidence data reported by the device C, that the entered voice is the voice of the user 1 (in other words, the voiceprint recognition result of the device C is the user 1). In other words, if the voiceprint recognition results of the device A, the device B, and the device C are the user 1, and the results are consistent, the server determines that the voiceprint recognition result indicates the user 1.

S107: The server obtains the corrected confidence.

In an implementation, the server obtains the confidence reported by the device A, the device B, and the device C. The server further obtains the correction factors respectively corresponding to the device A, the device B, and the device C. Further, the server corrects the confidence by using the correction factor of each device, and obtains the corrected confidence that the entered voice belongs to each user.

Specifically, the server may calculate only corrected confidence that the entered voice belongs to a part of users.

For example, when the device A reports $con_{A1}$, $con_{A2}$, and $con_{A3}$ (in other words, the confidence reported by the device A relates to the user 1, the user 2, and the user 3), the device B reports $con_{B1}$, $con_{B2}$, and $con_{B4}$ (in other words, the confidence reported by the device B relates to the user 1, the user 2, and the user 4), and the device C reports $con_{C1}$ and $con_{C2}$ (in other words, the confidence reported by the device C involves the user 1 and the user 2), a union set of the users involved in the reported data is the user 1, the user 2, the user 3, and the user 4. In this case, the server separately calculates the corrected confidence that the entered voice belongs to the user 1, the user 2, the user 3, and the user 4.

For another example, when the device A reports $con_{A1}$, $con_{A2}$, and $con_{A3}$ (in other words, the confidence reported by the device A relates to the user 1, the user 2, and the user 3), the device B reports $con_{B1}$, $con_{B2}$, and $con_{B3}$ (in other words, the confidence reported by the device B relates to the user 1, the user 2, and the user 3), and the device C reports $con_{c1}$, $con_{c2}$, and $con_{c3}$ (in other words, the confidence reported by the device C involves the user 1, the user 2, and the user 3), a union set of users involved in the reported data is the user 1, the user 2, and the user 3. In this case, the server separately calculates the corrected confidence that the entered voice belongs to the user 1, the user 2, and the user 3.

A method for calculating, by the server, corrected confidence that the entered voice belongs to each user specifically includes: correcting, by using a correction factor $\mu_{ij}$, confidence $con_{ij}$ that is obtained by a device i and that the entered voice belongs to a user j, to obtain corrected confidence $W_{ij}$, where $W_{ij}=\mu_{ij}*con_{ij}$; and adding the corrected confidence that corresponds to each device and that the entered voice belongs to a same user j, to obtain corrected confidence $S_j$ that the entered voice belongs to the user j.

$$S_j = W_{Aj}+W_{Bj}+W_{Cj}+\ldots W_{ij}+\ldots = \mu_{Aj} \times con_{Aj} + \mu_{Bj} \times con_{Bj} + \mu C_j \times con_{Cj} + \ldots \mu_{ij} \times con_{ij} + \ldots$$

It should be noted that when the reported data does not include the confidence $con_{ij}$ that is obtained by the device i and that the entered voice belongs to the user j, optionally, the server may request the device to upload the confidence. Optionally, the server may further set the confidence value to a first value. For example, the first value is 0. For another example, the first value is the first confidence threshold. For another example, the first value is a value greater than 0 and less than the first confidence threshold.

For example, the device A reports $con_{A1}$, $con_{A2}$, and $con_{A3}$, the device B reports $con_{B1}$, $con_{B2}$, and $con_{B4}$, and the device C reports $con_{C1}$ and $con_{C2}$. The server calculates the corrected confidence that the entered voice belongs to the user 1, the user 2, the user 3, and the user 4 respectively. The corrected confidence that the entered voice belongs to the user 1 is $S_1=\mu_{A1} \times con_{A1}+\mu_{B1} \times con_{B1}+\mu_{C1} \times con_{C1}$, the corrected confidence that the entered voice belongs to the user 2 is $S_2=\mu_{A2} \times con_{A2}+\mu_{B2} \times con_{B2}+\mu_{C2} \times con_{C2}$, the corrected confidence that the entered voice belongs to the user 3 is $S_3=\mu_{A3} \times con_{A3}+\mu_{B3} \times con_{B3}+\mu_{C3} \times con_{C3}$, and the corrected confidence that the entered voice belongs to the user 4 is $S_4=\mu_{A4} \times con_{A4}+\mu_{B4} \times con_{B4}+\mu_{C4} \times con_{C4}$. The reported data does not include $con_{B3}$, $con_{C3}$, $con_{A4}$, and $con_{C4}$. Optionally, the server may request the device A to report $con_{A4}$, request the device B to report $con_{B3}$, and request the device C to report $con_{C3}$ and $con_{C4}$. Optionally, the server may set values of $con_{B3}$, $con_{C3}$, $con_{A4}$, and $con_{C4}$ to a first value.

It may be understood that accuracy of voiceprint recognition performed by each device is affected by a plurality of factors, for example, device configuration, device usage duration, duration for which a user performs voiceprint registration on a device, an ambient temperature of the device, ambient humidity of the device, a frequency and habit of using the device by the user, a user gender, a user age, a network status, and a distance between the user and the device. The server may use one or more correction factors to correct impact of each factor on voiceprint recognition, so as to improve accuracy of the voiceprint recognition result and reduce a false entry rate of voiceprint recognition.

It may be understood that a larger value of the correction factor indicates a larger weight of the confidence. For example, a device configuration factor is used to correct impact of the device configuration on the accuracy of voiceprint recognition performed by the device. For a device with a relatively high device configuration, the device configuration factor is set to a relatively large value. For a device with a relatively low device configuration, the device configuration factor is set to a relatively small value. In this way, a weight of confidence calculated by the device with the relatively high device configuration may be relatively high, and a weight of confidence calculated by the device with the relatively low device configuration may be relatively low. In other words, a weight of confidence calculated by a device with relatively higher reliability of a voiceprint recognition result is relatively high, and a weight of confidence calculated by a device with relatively lower reliability of a voiceprint recognition result is relatively low, so that the corrected confidence is more close to the confidence calculated by the device with higher reliability.

In some embodiments, the correction factor may include a device configuration factor σ, used to correct impact of the device configuration on the voiceprint recognition result. The device with the high device configuration corresponds to a large device configuration factor σ. The device with the low device configuration corresponds to a small device configuration factor σ.

In one example, performance of a pickup device (a microphone) of the device determines the device configuration. If the performance of the microphone is good, the device configuration of the device is high. If the performance of the microphone is poor, the device configuration of the device is low. For example, parameters that affect the performance of the microphone include sensitivity of the microphone, a signal-to-noise ratio of the microphone, a quantity of microphones on the device, a layout (e.g., a position) of the microphone on the device, and the like. Higher sensitivity of the microphone indicates better performance of the microphone and better far-field sound pickup effect of the device. In other words, the device configuration of the device is higher. A higher signal-to-noise ratio of the microphone indicates better sound restoration quality and better performance of the microphone. In other words, the device configuration of the device is higher. More microphones on the device indicate higher device configuration of the device. More distributed microphones on the device indicate higher device configuration of the device.

For example, different types of devices or different models of devices of a same type have different device configurations, and may have different values of corresponding device configuration factors.

For example, a device configuration factor of the device A is $\sigma_A$, a device configuration factor of the device B is $\sigma_B$, and a device configuration factor of the device C is $\sigma_C$.

In an example, a type of the device A is a mobile phone, a type of the device B is a sound box, and a type of the device C is a television. For example, a quantity of microphones configured on the television is greater than a quantity of microphones configured on the mobile phone, a quantity of microphones configured on the mobile phone is the same as a quantity of microphones configured on the sound box, and sensitivity of the microphone on the mobile phone is higher than sensitivity of the microphone on the sound box. Then $\sigma_C > \sigma_A > \sigma_B$.

In an example, the device A, the device B, and the device C have a same type but different models. For example, the types of the device A, the device B, and the device C are mobile phones. The model of the device A is Huawei P30, the model of the device B is Huawei P20, and the model of the device C is Huawei Mate X. Microphones on the Huawei phones: Mate X, P30, and P20 rank in descending order in terms of performance. Correspondingly, $\sigma_C > \sigma_A > \sigma_B$.

In an implementation, a device configuration factor of a device may be set based on a device type or a device model of the device in a network.

For example, the server may store a device configuration factor table.

In an example, the device configuration factor table includes a correspondence between a device type and a device configuration factor. For example, the device configuration factor table is shown in Table 1-1.

TABLE 1-1

| Device type | Device configuration factor |
| --- | --- |
| Television | 1.8 |
| Mobile phone | 1.5 |
| Sound box | 0.8 |
| ... | ... |

In another example, the device configuration factor table includes a correspondence between a device model and a device configuration factor. For example, the device configuration factor table is shown in Table 1-2.

TABLE 1-2

| Device model | Device configuration factor |
| --- | --- |
| HUAWEI P30 | 1.8 |
| HUAWEI P20 | 1.5 |
| Huawei Honor YOYO | 0.8 |
| ... | ... |

In an example, if the device type (or the device model) is not included in the device configuration factor table, a corresponding device configuration factor may be determined based on the device type (or the device model) of the device. A correspondence between the device type (or device model) and the device configuration factor is added to the device configuration factor table.

In another example, a correspondence between a device type (or a device model) and a device configuration factor in the device configuration factor table may be updated.

In an implementation, the correspondence between the device type (or the device model) and the device configuration factor may be manually added to the device configuration factor table, or the correspondence between the device type (or the device model) and the device configuration factor may be manually updated to the device configuration factor table.

In another implementation, the server may automatically add the correspondence between the device type (or the device model) and the device configuration factor to the device configuration factor table, or update the correspondence between the device type (or the device model) and the device configuration factor to the device configuration factor table. For example, a vendor releases a new product. The server may obtain a device model of the released new product from a network, and may further obtain a configuration of a sound pickup device of the new product from the network. In this way, the server may add a correspondence between a device type (or the device model) of the new product and a device configuration factor to the device configuration factor table based on the configuration of the new product.

When the device reports the confidence to the server, the server may obtain the device type (or the device model) of the device, and determine the device configuration factor of the device based on the device configuration factor table. For example, the device A reports the confidence to the server. If determining that the device model of the device A is Huawei P30, the server determines, based on the device configuration factor tables 1-2, that the device configuration factor $\sigma_A$ corresponding to the device is 1.8.

In the foregoing embodiment, an example in which a device configuration factor is set by using a device type (or a device model) classification of a device is used. It may be understood that a person skilled in the art may further set the device configuration factor in another classification manner, provided that the impact of the device configuration on the voiceprint recognition result can be corrected. This is not limited in this embodiment of this application.

After the confidence $con_{ij}$ that is obtained by the device i and that the entered voice belongs to the user j is corrected by using the correction factor $\sigma_i$ of the device i, corrected confidence $W_{ij}$ that corresponds to the device i and that the entered voice belongs to the user j is obtained, where $W_{ij} = \sigma_i \times con_{ij}$.

For example, after the correction, corresponding to the device A, confidence that the entered voice belongs to the user 1 is $W_{A1} = \sigma_A \times con_{A1}$, confidence that the entered voice belongs to the user 2 is $W_{A2}=\sigma_A \times con_{A2}$, confidence that the entered voice belongs to the user 3 is $W_{A3}=\sigma_A \times con_{A3}$, and confidence that the entered voice belongs to the user 4 is $W_{A4}=\sigma_A \times con_{A4}$.

After the correction, corresponding to the device B, confidence that the entered voice belongs to the user 1 is $W_{B1}=\sigma_B \times con_{B1}$, confidence that the entered voice belongs to the user 2 is $W_{B2}=\sigma_B \times con_{B2}$, confidence that the entered voice belongs to the user 3 is $W_{B3}=\sigma_B \times con_{B3}$, and confidence that the entered voice belongs to the user 4 is $W_{B4}=\sigma_B \times con_{B4}$.

After the correction, corresponding to the device C, confidence that the entered voice belongs to the user 1 is $W_{C1}=\sigma_C \times con_{C1}$, confidence that the entered voice belongs to the user 2 is $W_{C2}=\sigma_C \times con_{C2}$, confidence that the entered voice belongs to the user 3 is $W_{C3}=\sigma_C \times con_{C3}$, and confidence that the entered voice belongs to the user 4 is $W_{C4}=\sigma_C \times con_{C4}$.

In some embodiments, the correction factor may include a voiceprint registration duration factor $\lambda$, used to correct impact of the voiceprint registration duration on the voiceprint recognition result. For example, a value of the voiceprint registration duration factor varies with duration for which the registered user performs voiceprint registration on the device. For example, a longer time for which the registered user performs voiceprint registration on the device indicates a smaller value of the voiceprint registration duration factor $\lambda$. For example, if the voiceprint registration duration is less than six months, a corresponding voiceprint registration duration factor is a first duration factor (for example, 1.50). If the voiceprint registration duration is greater than or equal to 6 months and less than 12 months, a corresponding voiceprint registration duration factor is a second duration factor (for example, 1.00). If the voiceprint registration duration is greater than or equal to 12 months and less than 24 months, a corresponding voiceprint registration duration factor is a third duration factor (for example, 0.75). If the voiceprint registration duration is greater than or equal to 24 months, a corresponding voiceprint registration duration factor is a fourth duration factor (for example, 0.50). Particularly, if the voiceprint registration duration is 0, in other words, if a user does not perform voiceprint registration on the device, a corresponding voiceprint registration duration factor is 0.

For example, the server may store a voiceprint registration duration factor table.

In an example, the voiceprint registration duration factor table includes a correspondence among a device, a registered user, and a voiceprint registration duration factor. For example, the voiceprint registration duration factor table is shown in Table 2-1.

TABLE 2-1

| Device identifier | Registered user identifier | Voiceprint registration duration | Voiceprint registration duration factor |
|---|---|---|---|
| Device A | User 1 | 0.5 months | 1.50 |
| Device B | User 1 | 3 months | 1.50 |
| Device B | User 2 | 24 months | 0.50 |
| ... | ... | ... | ... |
| Device i | User j | 9 months | 1.00 |
| ... | ... | ... | ... |

For example, when receiving an operation of performing voiceprint registration on the device by the registered user, the device may report a voiceprint registration event to the server. The server may update the voiceprint registration duration factor table based on a time at which the voiceprint registration event is received. When the device reports the confidence to the server, the server may obtain the corresponding voiceprint registration duration factor by querying the voiceprint registration duration factor table based on the device identifier and the registered user identifier.

In another example, the voiceprint registration duration factor table includes a correspondence between a voiceprint registration duration and a voiceprint registration duration factor. For example, the voiceprint registration duration factor table is shown in Table 2-2.

TABLE 2-2

| Voiceprint registration duration | Voiceprint registration duration factor |
|---|---|
| 0 to 5 months | 1.50 |
| 6 to 11 months | 1.00 |
| 12 to 23 months | 0.75 |
| More than 24 months | 0.50 |

In an implementation, when reporting the confidence to the server, the device may report duration for which a registered user performs voiceprint registration on the device, and the server obtains a corresponding voiceprint registration duration factor based on the voiceprint registration duration factor table.

In another implementation, when reporting the confidence to the server, the device may report a time at which the registered user performs voiceprint registration on the device, and the server may calculate, based on the time at which the registered user performs voiceprint registration, duration for which the registered user performs voiceprint registration, and obtain the corresponding voiceprint registration duration factor based on the voiceprint registration duration factor table.

After the confidence $con_{ij}$ that is obtained by the device i and that the entered voice belongs to the user j is corrected by using a correction factor $\lambda_{ij}$ of the user j of the device i, the corrected confidence $W_{ij}$ that corresponds to the device i and that the entered voice belongs to the user j is obtained, where $W_{ij}=\lambda_{ij} \times con_{ij}$.

For example, corresponding to the device A, confidence that the entered voice belongs to the user 1 is $W_{A1}=\lambda_{A1} \times con_{A1}$, confidence that the entered voice belongs to the user 2 is $W_{A2}=\lambda_{A2} \times con_{A2}$, confidence that the entered voice belongs to the user 3 is $W_{A3}=\lambda_{A3} \times con_{A3}$, and confidence that the entered voice belongs to the user 4 is $W_{A4}=\lambda_{A4} \times con_{A4}$.

Corresponding to the device B, confidence that the entered voice belongs to the user 1 is $W_{B1}=\lambda_{B1} \times con_{B1}$, confidence that the entered voice belongs to the user 2 is $W_{B2}=\lambda_{B2} \times con_{B2}$, confidence that the entered voice belongs to the user 3 is $W_{B3}=\lambda_{B3} \times con_{B3}$, and confidence that the entered voice belongs to the user 4 is $W_{B4}=\lambda_{B4} \times con_{B4}$.

Corresponding to the device C, confidence that the entered voice belongs to the user 1 is $W_{C1}=\lambda_{C1} \times con_{C1}$, confidence that the entered voice belongs to the user 2 is $W_{C2}=\lambda_{C2} \times con_{C2}$, confidence that the entered voice belongs to the user 3 is $W_{C3}=\lambda_{C3} \times con_{C3}$, and confidence that the entered voice belongs to the user 4 is $W_{C4}=\lambda_{C4} \times con_{C4}$.

In some embodiments, the correction factor may include a device usage duration factor $\theta$, used to correct impact of the device usage duration on the voiceprint recognition result. For example, a value of a device usage duration factor varies with device usage duration. For example, longer device usage duration indicates a smaller value of the device usage duration factor θ. For example, when the device usage duration is less than three months, a corresponding device usage duration factor is a first duration value (for example, 1.00). When the device usage duration is greater than or equal to 3 months and less than 6 months, a corresponding device usage duration factor is a second duration value (for example, 0.90). When the device usage duration is greater than or equal to 6 months and less than 12 months, a corresponding device usage duration factor is a third duration value (for example, 0.80). When the device usage duration is greater than or equal to 12 months, a corresponding device usage duration factor is a fourth duration value (for example, 0.60).

For example, the server may store a device usage duration factor table. In an example, the device usage duration factor table includes a correspondence between a device and a device usage duration factor. For example, the device usage duration factor table is shown in Table 3-1.

TABLE 3-1

| Device identifier | Device usage duration | Device usage duration factor |
|---|---|---|
| Device A | 1 month | 1.00 |
| Device B | 10 months | 0.80 |
| Device C | 24 months | 0.60 |
| ... | ... | ... |
| Device i | 5 months | 0.90 |
| ... | ... | ... |

The server can record a time at which the device joins the network and periodically update the device usage duration factor table. When the device reports the confidence to the server, the server may obtain a corresponding device usage duration factor by querying the device usage duration factor table based on the device identifier.

In another example, the device usage duration factor table includes a correspondence between device usage duration and a device usage duration factor. For example, the device usage duration factor table is shown in Table 3-2.

When reporting the confidence to the server, the device may report device usage duration, and the server obtains a corresponding device duration factor based on the device duration factor table.

TABLE 3-2

| Device usage duration | Device usage duration factor |
|---|---|
| 0 to 2 months | 1.00 |
| 3 to 5 months | 0.90 |
| 6 to 11 months | 0.80 |
| More than 12 months | 0.60 |

After confidence $con_{ij}$ that is obtained by the device i and that the entered voice belongs to the user j is corrected by using the correction factor $\theta_i$ of the device i, corrected confidence $W_{ij}$ that corresponds to the device i and that the entered voice belongs to the user j is obtained, where $W_{ij}=\theta_i \times con_{ij}$.

For example, corresponding to the device A, confidence that the entered voice belongs to the user 1 is $W_{A1}=\theta_A \times con_{A1}$, confidence that the entered voice belongs to the user 2 is $W_{A2}=\theta_A \times con_{A2}$, confidence that entered voice belongs to the user 3 is $W_{A3}=\theta_A \times con_{A3}$, and confidence that the entered voice belongs to the user 4 is $W_{A4}=\theta_A \times con_{A4}$.

Corresponding to the device B, confidence that the entered voice belongs to the user 1 is $W_{B1}=\theta_B \times con_{B1}$, confidence that the entered voice belongs to the user 2 is $W_{B2}=\theta_B \times con_{B2}$, confidence that the entered voice belongs to the user 3 is $W_{B3}=\theta_B \times con_{B3}$, and confidence that the entered voice belongs to the user 4 is $W_{B4}=\theta_B \times con_{B4}$.

Corresponding to the device C, confidence that the entered voice belongs to the user 1 is $W_{C1}=\theta_C \times con_{C1}$, confidence that the entered voice belongs to the user 2 is $W_{C2}=\theta_C \times con_{C2}$, confidence that the entered voice belongs to the user 3 is $W_{C3}=\theta_C \times con_{C3}$, and confidence that the entered voice belongs to the user 4 is $W_{C4}=\theta_C \times con_{C4}$.

It may be understood that the foregoing tables are merely examples, and a manner in which the server stores and obtains the correction factor is not limited in this embodiment of this application.

The server may obtain, through calculation based on the corrected confidence corrected confidence $S_j$ that the entered voice belongs to the user.

For example, after the confidence on the plurality of devices is corrected by using the device configuration factor σ, the corrected confidence $S_j$ are added to obtain the corrected confidence $S_j$ that the entered voice belongs to the user j, where $S_j=W_{Aj}+W_{Bj}+W_{Cj}+\ldots W_{ij}+\ldots$.

It is assumed that the plurality of devices are the device A, the device B, and the device C.

For example, the confidence calculated by the device A, the device B, and the device C is corrected by using only the device configuration factor σ. In this case, corrected confidence $S_1$ that the entered voice belongs to the user 1 is $\sigma_A \times con_{A1}+\sigma_B \times con_{B1}+\sigma_C \times con_{C1}$, corrected confidence $S_2$ that the entered voice belongs to the user 2 is $\sigma_A \times con_{A2}+\sigma_B \times con_{B2}+\sigma_C \times con_{C2}$, corrected confidence $S_3$ that the entered voice belongs to the user 3 is $\sigma_A \times con_{A3}+\sigma_B \times con_{B3}+\sigma_C \times con_{C3}$, and corrected confidence $S_4$ that the entered voice belongs to the user 4 is $\sigma_A \times con_{A4}+\sigma_B \times con_{B4}+\sigma_C \times con_{C4}$. $\sigma_A$ is a device configuration factor of the device A, $\sigma_B$ is a device configuration factor of the device B, $\sigma_C$ is a device configuration factor of the device C, and $\sigma_i$ is a device configuration factor of the device i.

For another example, the confidence calculated by the device A, the device B, and the device C is corrected by using only the voiceprint registration duration factor λ. In this case, the corrected confidence $S_1$ that the entered voice belongs to the user 1 is $\lambda_{A1} \times con_{A1}+\lambda_{B1} \times con_{B1}+\lambda_{C1} \times con_{C1}$, the corrected confidence $S_2$ that the entered voice belongs to the user 2 is $\lambda_{A2} \times con_{A2}+\lambda_{B2} \times con_{B2}+\lambda_{C2} \times con_{C2}$, the corrected confidence $S_3$ that the entered voice belongs to the user 3 is $\lambda_{A3} \times con_{A3}+\lambda_{B3} \times con_{B3}+\lambda_{C3} \times con_{C3}$, and the corrected confidence $S_4$ that the entered voice belongs to the user 4 is $\lambda_{A4} \times con_{A4}+\lambda_{B4} \times con_{B4}+\lambda_{C4} \times con_{C4}$.

For another example, the confidence calculated by the device A, the device B, and the device C is corrected by using only the device usage duration factor θ. In this case, the corrected confidence $S_1$ that the entered voice belongs to the user 1 is $\theta_A \times con_{A1}+\theta_B \times con_{B1}+\theta_C \times con_{C1}$, the confidence $S_2$ that the entered voice belongs to the user 2 is $\theta_A \times con_{A2}+\theta_B \times con_{B2}+\theta_C \times con_{C2}$, the corrected confidence $S_3$ that the entered voice belongs to the user 3 is $\theta_A \times con_{A3}+\theta_B \times con_{B3}+\theta_C \times con_{C3}$, and the corrected confidence $S_4$ that the entered voice belongs to the user 4 is $\theta_A \times con_{A4}+\theta_B \times con_{B4}+\theta_C \times con_{C4}$.

It may be understood that the server may perform correction by using only one correction factor, or may perform correction by using a plurality of correction factors, to obtain the corrected confidence $S_j$ that the entered voice belongs to the user j.

For example, the confidence on the plurality of devices is corrected by using the device configuration factor σ, the voiceprint registration duration factor λ, and the device usage duration factor θ, to obtain the corrected confidence that the entered voice belongs to the user J.

$$S_j = W_{Aj} + W_{Bj} + W_{Cj} + \ldots W_{ij} + \ldots = (\sigma_A + \lambda_{Aj} + \theta_A) \times \text{con}_{Aj} + (\sigma_B + \lambda_{Bj} + \theta_B) \times \text{con}_{Bj} + (\sigma_C + \lambda_{Cj} + \theta_C) \times \text{con}_{Cj} + \ldots (\sigma_i + \lambda_{ij} + \theta_i) \times \text{con}_{ij} + \ldots$$

For example, the confidence calculated by the device A, the device B, and the device C are corrected by using the device configuration factor σ, the voiceprint registration duration factor λ, and the device usage duration factor θ. In this case, the corrected confidence $S_1$ that the entered voice belongs to the user 1 is $(\sigma_A + \lambda_{A1} + \theta_A)*\text{con}_{A1} + (\sigma_B + \lambda_{B1} + \theta_B)*\text{con}_{B1} + (\sigma_C + \lambda_{C1} + \theta_C)*\text{con}_{C1}$, the corrected confidence $S_2$ that the entered voice belongs to the user 2 is $(\sigma_A + \lambda_{A2} + \theta_A)*\text{con}_{A2} + (\sigma_B + \lambda_{B2} + \theta_B)*\text{con}_{B2} + (\sigma_C + \lambda_{C2} + \theta_C)*\text{con}_{C2}$, the corrected confidence $S_3$ that the entered voice belongs to the user 3 is $(\sigma_A + \lambda_{A3} + \theta_A)*\text{con}_{A3} + (\sigma_B + \lambda_{B3} + \theta_B)*\text{con}_{B3} + (\sigma_C + \lambda_{C3} + \theta_C)*\text{con}_{C3}$, and the corrected confidence $S_4$ that the entered voice belongs to the user 4 is $(\sigma_A + \lambda_{A4} + \theta_A)*\text{con}_{A4} + (\sigma_B + \lambda_{B4} + \theta_B)*\text{con}_{B4} + (\sigma_C + \lambda_{C4} + \theta_C)*\text{con}_{C4}$.

It may be understood that, in this embodiment of this application, an example in which the correction factor includes the device configuration factor σ, the voiceprint registration duration factor σ, and the device usage duration factor θ is used for description. In actual application, more or fewer correction factors may be set. This is not limited in this embodiment of this application.

S108: The server determines a voiceprint recognition result based on the corrected confidence.

If the corrected confidence is less than or equal to a second confidence threshold, the server determines that the entered voice does not belong to the registered user. For example, the second confidence threshold is 0.8. If $S_1$, $S_2$, $S_3$, and $S_4$ are all less than 0.8, the server determines that the entered voice does not belong to the registered user.

If a corrected confidence value is greater than another corrected confidence value and exceeds the second confidence threshold, the server determines that a user corresponding to the corrected confidence is a user to which the entered voice belongs. For example, if the second confidence threshold is 0.8, and $S_1 > S_2 > S_3 > 0.8$, the server determines that the user 1 corresponding to $S_1$ is the user to which the entered voice belongs (in other words, the voiceprint recognition result indicates the user 1).

S109: The server returns the voiceprint recognition result to the devices.

In an implementation, the server separately returns the voiceprint recognition result to the plurality of devices. In another implementation, the server returns the voiceprint recognition result to one of the plurality of devices. For example, the server returns the voiceprint recognition result to any one of the plurality of devices. For example, the server determines, based on voice content, to return the voiceprint recognition result to one of the plurality of devices.

S10a: The devices receive the voiceprint recognition result.

After receiving the voiceprint recognition result, the device may provide a corresponding service for the user based on the voiceprint recognition result.

For example, in FIG. 2, the mobile phone, the sound box, and the television receive the entered voice "Xiaoyi Xiaoyi, play a song." The server determines that the entered voice belongs to the user 1, and notifies the sound box of the voiceprint recognition result. The sound box may play music based on a playing record of the user 1.

For example, in FIG. 2, the mobile phone, the sound box, and the television receive the entered voice "Xiaoyi Xiaoyi, play a song." The server determines that the entered voice does not belong to the registered user, and notifies the sound box of the voiceprint recognition result. The sound box can play a piece of music at random.

For example, in FIG. 2, the mobile phone, the sound box, and the television receive the entered voice "Xiaoyi Xiaoyi, show me tomorrow's meeting schedule." The server determines that the entered voice belongs to the user 1, and notifies the mobile phone of the voiceprint recognition result. The mobile phone A can play the meeting schedule of the user 1 tomorrow.

According to the voiceprint recognition method provided in this embodiment of this application, the voiceprint recognition result is determined based on the confidence calculated by the plurality of devices, so that impact of voiceprint recognition accuracy of a single device on the voiceprint recognition result can be reduced, and the false entry rate of voiceprint recognition can be reduced. If the voiceprint recognition results of the plurality of devices are consistent, it indicates that the current voiceprint recognition result has high reliability and a low false entry rate. If the voiceprint recognition results of the plurality of devices are inconsistent, it indicates that the voiceprint recognition results of the at least one device have an error. According to the voiceprint recognition method provided in this embodiment of this application, a correction factor may be further used to correct the confidence calculated by the plurality of devices, and the voiceprint recognition result is determined by using the corrected confidence. The correction factor may be set based on a plurality of factors that affect the accuracy of the voiceprint recognition performed by the device, for example, the device configuration, the voiceprint registration duration, and the device usage duration. In this way, a weight of confidence calculated by a device with high reliability of the voiceprint recognition result is higher, and a weight of confidence calculated by a device with low reliability of the voiceprint recognition result is lower, so that the corrected confidence is more close to the confidence calculated by the device with higher reliability, the accuracy of the voiceprint recognition result is improved, and the false entry rate of the voiceprint recognition is effectively reduced.

Figure 6:
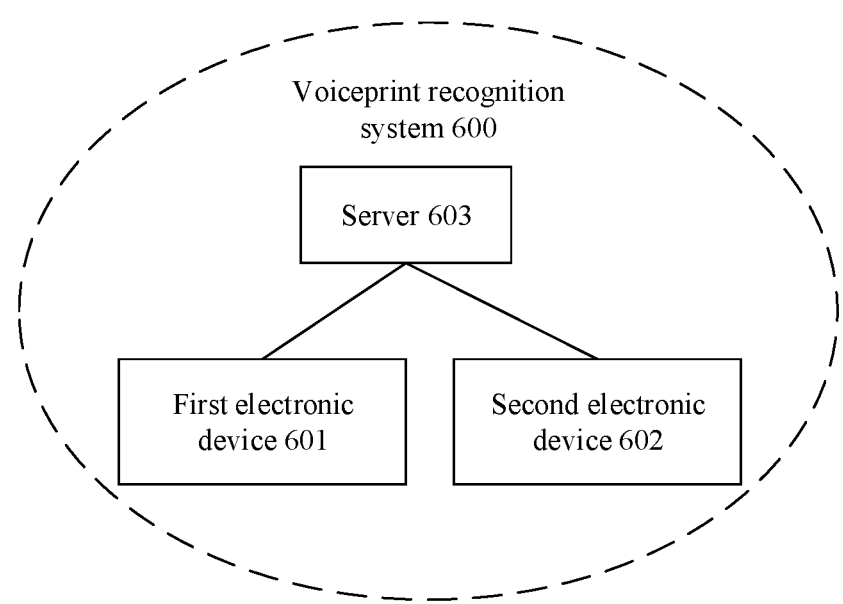
FIG. 6 is a schematic architecture diagram of a voiceprint recognition system according to an embodiment of this application.

An embodiment of this application further provides a voiceprint recognition system. As shown in FIG. 6, the voiceprint recognition system 600 may include a first electronic device 601, a second electronic device 602, and a server 603.

The first electronic device 601 is configured to receive, in response to a voice input of a user, a first voice entered by a user. The first electronic device 601 includes first voiceprint information of a first registered user and second voiceprint information of a second registered user.

The second electronic device 602 is configured to receive, in response to the voice input of the user, a second voice entered by the user. The second electronic device 602 includes third voiceprint information of the first registered user and fourth voiceprint information of the second registered user.

The first electronic device 601 is further configured to: determine, based on the first voiceprint information, first confidence that the first voice belongs to the first registered user, and determine, based on the second voiceprint information, second confidence that the first voice belongs to the second registered user; and further configured to send the first confidence and the second confidence to the server.

The second electronic device 602 is further configured to: determine, based on the third voiceprint information, third confidence that the second voice belongs to the first registered user, and determine, based on the fourth voiceprint information, fourth confidence that the second voice belongs to the second registered user; and further configured to send the third confidence and the fourth confidence to the server.

The server 603 is configured to receive the first confidence, the second confidence, the third confidence, and the fourth confidence.

The server 603 is further configured to: determine, based on the first confidence and the third confidence, fifth confidence that the user is the first registered user, and determine, based on the second confidence and the fourth confidence, sixth confidence that the user is the second registered user.

The server 603 is further configured to determine, based on the fifth confidence and the sixth confidence, that the user is the first registered user or the second registered user.

In an implementation, if determining that the fifth confidence is greater than the sixth confidence, the server 603 determines that the user is the first registered user. If determining that the sixth confidence is greater than the fifth confidence, the server 603 determines that the user is the second registered user.

In an implementation, that the server 603 determines, based on the first confidence and the third confidence, the fifth confidence that the user is the first registered user specifically includes: The server 603 determines the fifth confidence by performing weighted summation on the first confidence and the third confidence. That the server 603 determines the sixth confidence that the user is the second registered user based on the second confidence and the fourth confidence specifically includes: the server 603 determines the sixth confidence by performing weighted summation on the second confidence and the fourth confidence.

In an implementation, that the server 603 determines, based on the first confidence and the third confidence, the fifth confidence that the user is the first registered user, and determines, based on the second confidence and the fourth confidence, the sixth confidence that the user is the second registered user specifically includes: The server 603 corrects the first confidence, the second confidence, the third confidence, and the fourth confidence based on a correction factor, determines the fifth confidence based on the corrected first confidence and the corrected third confidence, and determines the sixth confidence based on the corrected second confidence and the corrected fourth confidence.

In an implementation, the server 603 is further configured to: determine a size relationship between the first confidence and the second confidence, and determine a size relationship between the third confidence and the fourth confidence. If determining that the first confidence is greater than the second confidence and the third confidence is greater than the fourth confidence, the server 603 determines that the user is the first registered user. If determining that the first confidence is less than the second confidence and the third confidence is less than the fourth confidence, the server 603 determines that the user is the second registered user.

In an implementation, the server 603 is further configured to: determine a size relationship between the first confidence and the second confidence, and determine a size relationship between the third confidence and the fourth confidence. If determining that the first confidence is greater than the second confidence and the third confidence is less than the fourth confidence, the server 603 determines, based on the first confidence and the third confidence, fifth confidence that the user is the first registered user, determines, based on the second confidence and the fourth confidence, sixth confidence that the user is the second registered user. If determining that the first confidence is less than the second confidence and the third confidence is greater than the fourth confidence, the server 603 determines, based on the first confidence and the third confidence, the fifth confidence that the user is the first registered user, and determines, based on the second confidence and the fourth confidence, the sixth confidence that the user is the second registered user.

In an implementation, the first electronic device 601 is further configured to: output, in response to the fact that the server determines that the user is the first registered user, first information related to the first registered user, and further configured to output, in response to the fact that the server determines that the user is the second registered user, second information related to the second registered user.

In an implementation, the second electronic device 602 is further configured to: output, in response to the fact that the server determines that the user is the first registered user, first information related to the first registered user, and further configured to output, in response to the fact that the server determines that the user is the second registered user, second information related to the second registered user.

In an example, the first electronic device 601 may be the device A in FIG. 1, the second electronic device 602 may be the device B in FIG. 1, and the server 603 may be the server 200 in FIG. 1.

It can be understood that, to implement the foregoing functions, the electronic device and the server include a corresponding hardware structure and/or software module for performing each of the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In an example, the server in the foregoing embodiment may include the structure shown in FIG. 4.

An embodiment of this application further provides a computer storage medium. The computer storage medium stores computer program code. When the processor executes the computer program code, the electronic device performs related method steps performed by the server in FIG. 5, to implement the method in the foregoing embodiment.

An embodiment of this application further provides a computer program product. When the computer program product is run on a computer, the computer is enabled to perform the related method steps that are performed by the server in FIG. 5, to implement the method in the foregoing embodiment.

The computer storage medium or the computer program product provided in the embodiments of this application are all configured to perform the foregoing corresponding methods. Therefore, for beneficial effects that can be achieved, refer to the beneficial effects in the foregoing corresponding methods. Details are not described herein again.

The foregoing description about implementations allows a person skilled in the art to understand that, for ease of description and brevity, division of the foregoing functional modules is used as an example for description. In an actual application, the foregoing functions can be allocated to different modules and implemented according to a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processor, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes any medium that can store program code, such as a USB flash drive, a removable hard disk, a ROM, a magnetic disk, or an optical disc.

The foregoing descriptions are merely specific implementations of the present invention, but are not intended to limit the protection scope of the present invention. Any variation or replacement readily figured out by the person skilled in the art within the technical scope disclosed in the present invention shall fall within the protection scope of the present invention. Therefore, the protection scope of the present invention shall be subject to the protection scope of the claims.

What is claimed is:

1. A voiceprint recognition method, wherein a first electronic device comprises first voiceprint information of a first registered user and second voiceprint information of a second registered user, a second electronic device comprises third voiceprint information of the first registered user and fourth voiceprint information of the second registered user, wherein each of the first electronic device and the second electronic device includes a processor, a memory, and a sound pickup device, and the method comprises:

in response to a voice input of a user, receiving, by the sound pickup device of the first electronic device, a first voice entered by the user, and receiving, by the sound pickup device of the second electronic device, a second voice entered by the user;

determining, by the processor of the first electronic device based on the first voiceprint information, a first confidence value that the first voice belongs to the first registered user, and determining, based on the second voiceprint information, a second confidence value that the first voice belongs to the second registered user; and determining, by the processor of the second electronic device based on the third voiceprint information, a third confidence value that the second voice belongs to the first registered user, and determining, based on the fourth voiceprint information, a fourth confidence value that the second voice belongs to the second registered user;

sending, by the first electronic device, the first confidence value and the second confidence value to a server, and sending, by the second electronic device, the third confidence value and the fourth confidence value to the server, wherein the server includes a processor and a memory;

receiving, by the processor of the server, the first confidence value, the second confidence value, the third confidence value, and the fourth confidence value;

determining, by the processor of the server based on the first confidence value and the third confidence value, a fifth confidence value that the user is the first registered user, and determining, based on the second confidence value and the fourth confidence value, a sixth confidence value that the user is the second registered user; and determining, by the processor of the server, that the user is the first registered user when the fifth confidence value is greater than the sixth confidence value, or determining, by the server, that the user is the second registered user when the sixth confidence value is greater than the fifth confidence value.

2. The method according to claim 1, wherein the determining, by the processor of the server based on the first confidence value and the third confidence value, the fifth confidence value that the user is the first registered user comprises:

determining, by the processor of the server, the fifth confidence value by performing weighted summation on the first confidence value and the third confidence value; and wherein the determining, by the processor of the server based on the second confidence value and the fourth confidence value, the sixth confidence value that the user is the second registered user comprises:

determining, by the processor of the server, the sixth confidence value by performing weighted summation on the second confidence value and the fourth confidence value.

3. The method according to claim 1, wherein the determining, by the processor of the server based on the first confidence value and the third confidence value, the fifth confidence value that the user is the first registered user, and determining, by the at least one processor of the server based on the second confidence value and the fourth confidence value, the sixth confidence value that the user is the second registered user comprises:

correcting, by the processor of the server, the first confidence value, the second confidence value, the third confidence value, and the fourth confidence value based on a correction factor;

determining, by the processor of the server, the fifth
confidence value based on the corrected first confidence
value and the corrected third confidence value; and
determining, by the processor of the server, the sixth
confidence value based on the corrected second confidence value and the corrected fourth confidence value.

4. The method according to claim 3, wherein:
the correction factor comprises one or more of a device configuration factor, a voiceprint registration duration factor, and a device usage duration factor, wherein the device configuration factor is related to a configuration of an electronic device, the voiceprint registration duration factor is related to voiceprint information, and the device usage duration factor is related to usage duration of the electronic device.

5. The method according to claim 4, wherein:
a larger value of the device configuration factor indicates a higher configuration of the electronic device;
a larger value of the voiceprint registration duration factor indicates that newer voiceprint information; and
a larger value of the device usage duration factor indicates shorter use duration of the electronic device.

6. The method according to claim 1, wherein before the determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user, the method further comprises:
determining, by the processor of the server, that the user is the first registered user responsive to determining that the first confidence value is greater than the second confidence value and the third confidence value is greater than the fourth confidence value; or
determining, by the processor of the server, that the user is the second registered user responsive to determining that the first confidence value is less than the second confidence value and the third confidence value is less than the fourth confidence value.

7. The method according to claim 1, wherein the determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user comprises:
determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user, responsive to determining that the first confidence value is greater than the second confidence value and the third confidence value is less than the fourth confidence value; or
determining, by the processor of the server based on the first confidence value and the third confidence value, the fifth confidence value that the user is the first registered user; and determining, by the processor of the server based on the second confidence value and the fourth confidence value, the sixth confidence value that the user is the second registered user, responsive to determining that the first confidence value is less than the second confidence value and the third confidence value is greater than the fourth confidence value.

8. The method according to claim 1, wherein the method further comprises:
in response to the fact that the processor of the server determines that the user is the first registered user, outputting, by the first electronic device or the second electronic device, first information related to the first registered user; or
in response to the fact that the processor of the server determines that the user is the second registered user, outputting, by the first electronic device or the second electronic device, second information related to the second registered user.

9. A voiceprint recognition method, comprising:
receiving, by a server that includes a processor, a first confidence value and a second confidence value from a first electronic device, wherein the first electronic device includes a processor, a memory, and a sound pickup device; and receiving, by the server, a third confidence value and a fourth confidence value from a second electronic device, wherein the second electronic device includes a processor, a memory, and a sound pickup device; wherein the first confidence value is determined by the processor of the first electronic device and represents a likelihood that a voice entered by a user and recorded by the sound pickup device of the first electronic device belongs to a first registered user, the second confidence value is determined by the processor of the first electronic device and represents a likelihood that the voice entered by the user and recorded by the sound pickup device of the first electronic device belongs to a second registered user, the third confidence value is determined by the processor of the second electronic device and represents a likelihood that the voice entered by the user and recorded by the sound pickup device of the second electronic device belongs to the first registered user, and the fourth confidence value is determined by the processor of the second electronic device and represents a likelihood that the voice entered by the user and recorded by the sound pickup device of the second electronic device belongs to the second registered user;
determining, by the processor of the server based on the first confidence value and the third confidence value, a fifth confidence value that the user is the first registered user, and determining, by the processor of the server based on the second confidence value and the fourth confidence value, a sixth confidence value that the user is the second registered user; and
determining, by the processor of the server, that the user is the first registered user responsive to determining that the fifth confidence value is greater than the sixth confidence value, or determining, by the processor of the server, that the user is the second registered user responsive to determining that the sixth confidence value is greater than the fifth confidence value.

10. The method according to claim 9, wherein:
the determining, by the processor of the server based on the first confidence value and the third confidence value, the fifth confidence value that the user is the first registered user comprises:
determining, by the processor of the server, the fifth confidence value by performing a weighted summation on the first confidence value and the third confidence value; or the determining, by the processor of the server based on the second confidence value and the fourth confidence value, the sixth confidence value that the user is the second registered user comprises:
    determining, by the processor of the server, the sixth confidence value by performing a weighted summation on the second confidence value and the fourth confidence value.

11. The method according to claim 9, wherein the determining, by processor of the server based on the first confidence value and the third confidence value, the fifth confidence value that the user is the first registered user, and determining, by the processor of the server based on the second confidence value and the fourth confidence value, the sixth confidence value that the user is the second registered user comprises:
    correcting, by the processor of the server, the first confidence value, the second confidence value, the third confidence value, and the fourth confidence value based on a correction factor;
    determining, by the processor of the server, the fifth confidence value based on the corrected first confidence value and the corrected third confidence value; and
    determining, by the processor of the server, the sixth confidence value based on the corrected second confidence value and the corrected fourth confidence value.

12. The method according to claim 11, wherein:
the correction factor comprises one or more of a device configuration factor, a voiceprint registration duration factor, and a device usage duration factor, wherein the device configuration factor is related to a configuration of an electronic device, the voiceprint registration duration factor is related to voiceprint information, and the device usage duration factor is related to usage duration of the electronic device.

13. The method according to claim 12, wherein:
a larger value of the device configuration factor indicates a higher configuration of the electronic device;
a larger value of the voiceprint registration duration factor indicates that newer voiceprint information; and
a larger value of the device usage duration factor indicates shorter use duration of the electronic device.

14. The method according to claim 9, wherein before the determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user, the method further comprises:
    determining, by the processor of the server, that the user is the first registered user responsive to determining that the first confidence value is greater than the second confidence value and the third confidence value is greater than the fourth confidence value; or
    determining, by the processor of the server, that the user is the second registered user responsive to determining that the first confidence value is less than the second confidence value and the third confidence value is less than the fourth confidence value.

15. The method according to claim 9, wherein the determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user comprises:
    responsive to determining that the first confidence value is greater than the second confidence value and the third confidence value is less than the fourth confidence value, determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user; or
    responsive to determining that the first confidence is less than the second confidence value and the third confidence value is greater than the fourth confidence value, determining, by the processor of the server based on the first confidence value and the third confidence value, the fifth confidence value that the user is the first registered user, and determining, by the processor of the server based on the second confidence value and the fourth confidence value, the sixth confidence value that the user is the second registered user.

16. A voiceprint recognition system, comprising a first electronic device, a second electronic device, and a server, wherein each of the first electronic device and the second electronic device includes a processor, a memory, and a sound pickup device, wherein the server includes a processor and a memory, and wherein the first electronic device comprises first voiceprint information of a first registered user and second voiceprint information of a second registered user, and the second electronic device comprises third voiceprint information of the first registered user and fourth voiceprint information of the second registered user;
    wherein the first electronic device is configured to:
    receive, in response to a voice input of a user, a first voice entered by the user and recorded by the sound pickup device of the first electronic device;
    determine, by the processor of the first electronic device based on the first voiceprint information, a first confidence value that the first voice belongs to the first registered user, and determine, by the processor of the first electronic device based on the second voiceprint information, a second confidence value that the first voice belongs to the second registered user; and
    send the first confidence value and the second confidence value to the server;
    wherein the second electronic device is configured to:
    receive, in response to the voice input of the user, a second voice entered by the user and recorded by the sound pickup device of the second electronic device;
    determine, by the processor of the second electronic device based on the third voiceprint information, a third confidence value that the second voice belongs to the first registered user, and determine, by the processor of the second electronic device based on the fourth voiceprint information, a fourth confidence value that the second voice belongs to the second registered user; and
    send the third confidence value and the fourth confidence value to the server; and
    wherein the server is configured to:
    receive the first confidence value and the second confidence value that are sent by the first electronic device;
    receive the third confidence value and the fourth confidence value that are sent by the second electronic device;

determine, by the processor of the server based on the first confidence value and the third confidence value, a fifth confidence value that the user is the first registered user, and determine, by the processor of the server based on the second confidence value and the fourth confidence value, a sixth confidence value that the user is the second registered user; and determine, by the processor of the server based on the fifth confidence value and the sixth confidence value, that the user is the first registered user or the second registered user.

17. The system according to claim 16, wherein that the processor of the server determines, based on the fifth confidence value and the sixth confidence value, that the user is the first registered user or the second registered user comprises:

responsive to determining that the fifth confidence value is greater than the sixth confidence value, determining, by the processor of the server, that the user is the first registered user, or responsive to determining that the sixth confidence value is greater than the fifth confidence value, determining, by the processor of the server, that the user is the second registered user.

18. An electronic device, wherein the electronic device is a server that comprises a processor and a memory, wherein the memory is coupled to the processor, the memory is configured to store computer program code, the computer program code comprises computer instructions, and responsive to the processor executing the computer instructions, the electronic device is enabled to perform:

receiving a first confidence value and a second confidence value from a first electronic device, wherein the first electronic device includes a processor, a memory, and a sound pickup device; and receiving a third confidence value and a fourth confidence value from a second electronic device, wherein the second electronic device includes a processor, a memory, and a sound pickup device; wherein the first confidence value is determined by the processor of the first electronic device and represents a likelihood that a voice entered by a user and recorded by the sound pickup device of the first electronic device belongs to a first registered user, the second confidence value is determined by the processor of the first electronic device and represents a likelihood that the voice entered by the user and recorded by the sound pickup device of the first electronic device belongs to a second registered user, the third confidence value is determined by the processor of the second electronic device and represents a likelihood that the voice entered by the user and recorded by the sound pickup device of the second electronic device belongs to the first registered user, and the fourth confidence value is determined by the processor of the second electronic device and represents a likelihood that the voice entered by the user and recorded by the sound pickup device of the second electronic device belongs to the second registered user;

determining, by the processor of the server based on the first confidence value and the third confidence value, a fifth confidence value that the user is the first registered user, and determining, by the processor of the server based on the second confidence value and the fourth confidence value, a sixth confidence value that the user is the second registered user; and determining, by the processor of the server, that the user is the first registered user responsive to determining that the fifth confidence value is greater than the sixth confidence value, or determining, by the processor of the server, that the user is the second registered user responsive to determining that the sixth confidence value is greater than the fifth confidence value.

* * * * *